US011865657B2

(12) United States Patent
Yoshikane et al.

(10) Patent No.: US 11,865,657 B2
(45) Date of Patent: Jan. 9, 2024

(54) IMPACT TOOL AND DUST COLLECTION SYSTEM

(71) Applicant: MAKITA CORPORATION, Anjo (JP)

(72) Inventors: Kiyonobu Yoshikane, Anjo (JP); Hiroki Takesashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/824,432

(22) Filed: May 25, 2022

(65) Prior Publication Data

US 2022/0388106 A1 Dec. 8, 2022

(30) Foreign Application Priority Data

Jun. 3, 2021 (JP) .................................. 2021-093825
Jun. 3, 2021 (JP) .................................. 2021-093826

(51) Int. Cl.
*B23Q 11/00* (2006.01)
*B23Q 11/12* (2006.01)
*B25B 21/02* (2006.01)

(52) U.S. Cl.
CPC ........ *B23Q 11/0071* (2013.01); *B23Q 11/127* (2013.01); *B25B 21/023* (2013.01)

(58) Field of Classification Search
CPC .. B23Q 11/0071; B23Q 11/127; B25B 21/023
See application file for complete search history.

(56) References Cited

U.S. PATENT DOCUMENTS

| 3,511,322 A * | 5/1970 | Holman ............. B23Q 11/0046 74/44 |
| 2009/0148248 A1* | 6/2009 | Nishikawa ........... B23Q 11/006 408/67 |
| 2011/0226502 A1* | 9/2011 | Bito .................... B23Q 11/0046 173/171 |
| 2019/0314943 A1* | 10/2019 | Machida .................. B25F 5/02 |
| 2019/0381618 A1* | 12/2019 | Furusawa ............ B23Q 11/127 |

FOREIGN PATENT DOCUMENTS

| JP | 6660572 B2 | 3/2020 |
| JP | 6726552 B2 | 7/2020 |
| JP | 6803242 B2 | 12/2020 |

* cited by examiner

*Primary Examiner* — Andrew M Tecco
*Assistant Examiner* — Nicholas E Igbokwe
(74) *Attorney, Agent, or Firm* — Oliff PLC

(57) ABSTRACT

An impact tool includes a housing, an impact mechanism unit, a motor, and a dust collection fan. The housing is configured to mount a dust collection attachment. The impact mechanism unit is disposed inside the housing. The impact mechanism unit has a front end to which a tool bit is mounted and an impact element that reciprocates. The impact mechanism unit is configured to impact the tool bit by the impact element. The motor is disposed such that a rotation shaft of the motor intersects with an impact axis direction of the impact mechanism unit inside the housing. The dust collection fan is disposed on the rotation shaft. The dust collection fan is disposed below the motor.

17 Claims, 18 Drawing Sheets

IMPACT TOOL AND DUST COLLECTION SYSTEM

BACKGROUND OF THE INVENTION

This application claims the benefit of Japanese Patent Application Numbers 2021-093825 and 2021-093826 filed on Jun. 3, 2021, the entire contents of which are incorporated herein by reference in its entirety.

TECHNICAL FIELD

The disclosure relates to an impact tool such as a hammer drill and a dust collection system constituted by coupling a dust collection attachment to the impact tool.

RELATED ART

An impact tool, such as a hammer drill, includes a dust collection attachment that collects and accumulates dust generated from a workpiece in a drilling work and similar work, in some cases.

As a dust collection system constituted of the impact tool and the dust collection attachment, a dust collection system is disclosed in Japanese Patent No. 6803242. The dust collection system communicates an air flow passage inside a dust collection (dust collection attachment) with an air flow passage inside the impact tool by mounting a dust collection fan to a motor shaft of the impact tool. In the dust collection system, rotation of the dust collection fan by a drive of a motor causes air suctioned from a suction opening disposed at a tool end to pass through a dust box inside the dust collector. Thus, dust can be captured by a filter inside the dust box and accumulated. The air passing through the filter enters the air flow passage inside the impact tool and is discharged outside via an exhaust outlet disposed in a housing of the impact tool.

The above-described conventional impact tool includes a dust collection fan on an upper portion of a motor shaft extending in an up-down direction. Thus, a motor housing becomes large in a radial direction corresponding to an outer diameter of the dust collection fan, and compactability is impaired.

Therefore, it is an object of the disclosure to provide an impact tool and a dust collection system that allows maintaining compactness even with a dust collection fan.

SUMMARY OF THE INVENTION

In order to achieve the above-described object, there is provided an impact tool that includes a housing, an impact mechanism unit, a motor, and a dust collection fan. The housing is configured to mount a dust collection attachment. The impact mechanism unit is disposed inside the housing. The impact mechanism unit has a front end to which a tool bit is mounted and an impact element that reciprocates. The impact mechanism unit is configured to impact the tool bit by the impact element. The motor is disposed such that a rotation shaft of the motor intersects with an impact axis direction of the impact mechanism unit inside the housing. The dust collection fan is disposed on the rotation shaft. The dust collection fan is disposed below the motor.

In order to achieve the above-described object, there is provided a dust collection system that includes the above-described impact tool and the dust collection attachment. The dust collection attachment has a suction opening for the tool bit and is mounted to the housing. The dust collection attachment generates a suctioning force to the suction opening by rotation of the dust collection fan.

According to the disclosure, since the dust collection fan is disposed below the motor, it is unnecessary to enlarge the housing portion of the motor corresponding to an outer diameter of the dust collection fan. Accordingly, downsizing of the impact tool can be maintained even when the dust collection fan is disposed.

DETAILED DESCRIPTION

Figure 1:
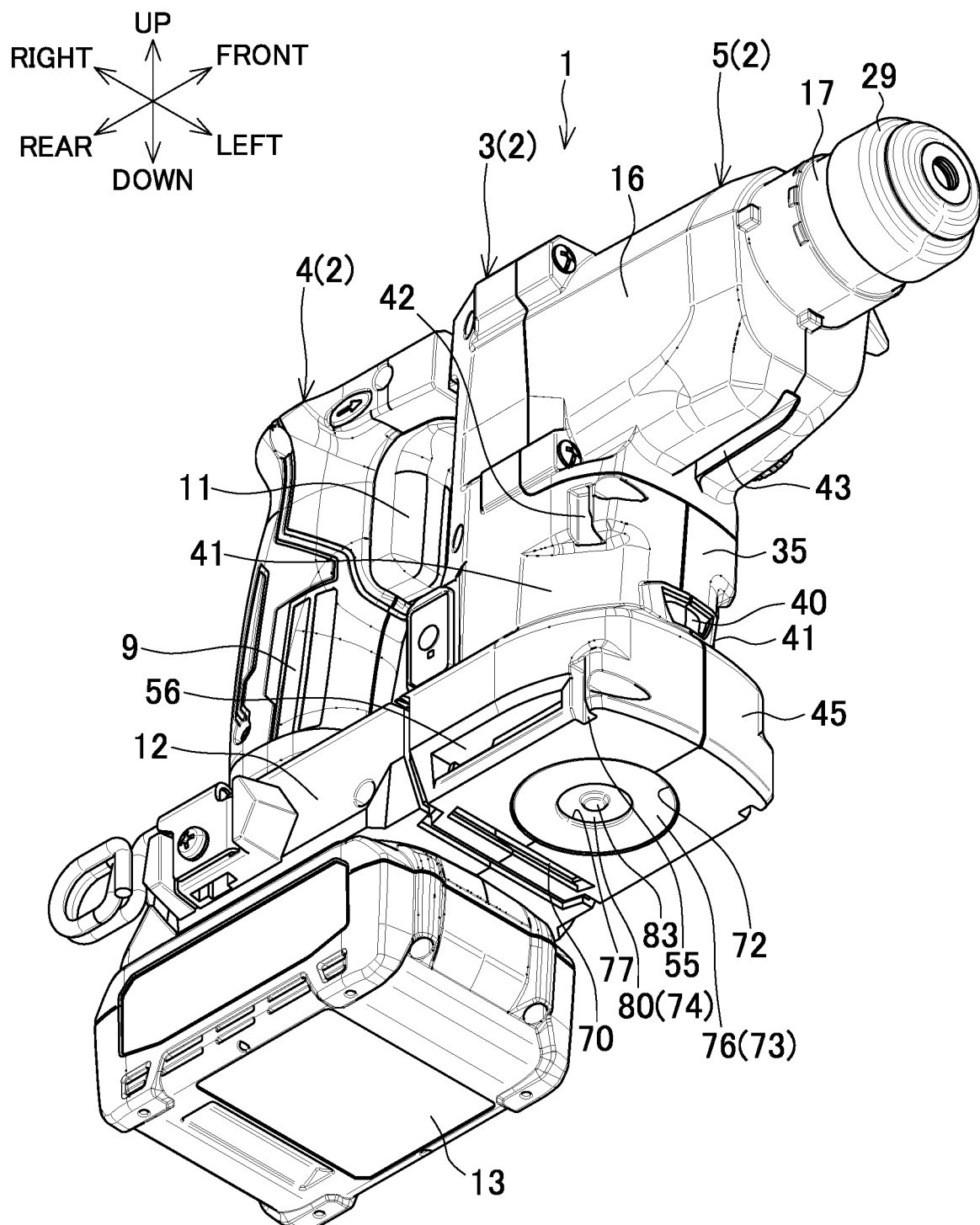
FIG. 1 is a perspective view from below a hammer drill.

In one embodiment of the disclosure, a motor cooling fan may be disposed on a rotation shaft and adjacent to a dust collection fan in an axial direction of the rotation shaft. According to the configuration, even when the motor cooling fan is disposed in addition to the dust collection fan, it is unnecessary to enlarge a housing portion of a motor in a radial direction, and thus, downsizing can be maintained.

In one embodiment of the disclosure, an air inlet that suctions air by rotation of the dust collection fan may be disposed on a lower surface of a housing. According to the configuration, a foreign matter such as dust is less likely to enter from the air inlet, and thus, a wide opening area for the air inlet can also be secured.

In one embodiment of the disclosure, an exhaust outlet that discharges air by the rotation of the dust collection fan may be disposed on the lower surface of the housing. According to the configuration, a foreign matter such as dust is less likely to enter from the exhaust outlet, and thus, a wide opening area for the exhaust outlet can also be secured.

In one embodiment of the disclosure, a second exhaust outlet that discharges air by the rotation of the dust collection fan may be disposed on a side surface of the housing. According to the configuration, a necessary airflow volume can be secured.

In one embodiment of the disclosure, a disk-shaped shutter may be configured to open or close the air inlet. According to the configuration, even when the air inlet is disposed, dust-proof performance and waterproof performance of an impact tool can be secured.

In one embodiment of the disclosure, the shutter may be disposed coaxially with the dust collection fan. According to the configuration, the shutter cab be compactly disposed. The air flows smoothly when the shutter is opened.

In one embodiment of the disclosure, a housing portion of the dust collection fan in the housing may be larger in right-left width than a housing portion of the motor in the housing. According to the configuration, the housing portion of the motor becomes slim and has better appearance.

In one embodiment of the disclosure, a bearing supporting the rotation shaft inside the housing may be disposed above the dust collection fan. According to the configuration, downsizing of the housing portion of the motor including a bearing portion can be maintained.

In one embodiment of the disclosure, a dust collection attachment may be configured to be mounted to the housing such that a projecting side engaging portion engages with a depressed side engaging portion by relatively sliding the dust collection attachment in a predetermined straight-line direction to the housing. The projecting side engaging portion is disposed at any one of the housing and the dust collection attachment, and the depressed side engaging portion is disposed in the other. The projecting side engaging portion or the depressed side engaging portion disposed in the housing may be separated into a plurality in the straight-line direction. According to the configuration, the dust collection attachment can be mounted without rattling even when the projecting side engaging portion and the depressed side engaging portion are not formed to be long. Thus, shape change of the housing becomes unnecessary, and the downsizing and weight reduction can be maintained.

The following describes embodiments of the disclosure based on the drawings. A description of a hammer drill is provided below.

Figure 2:
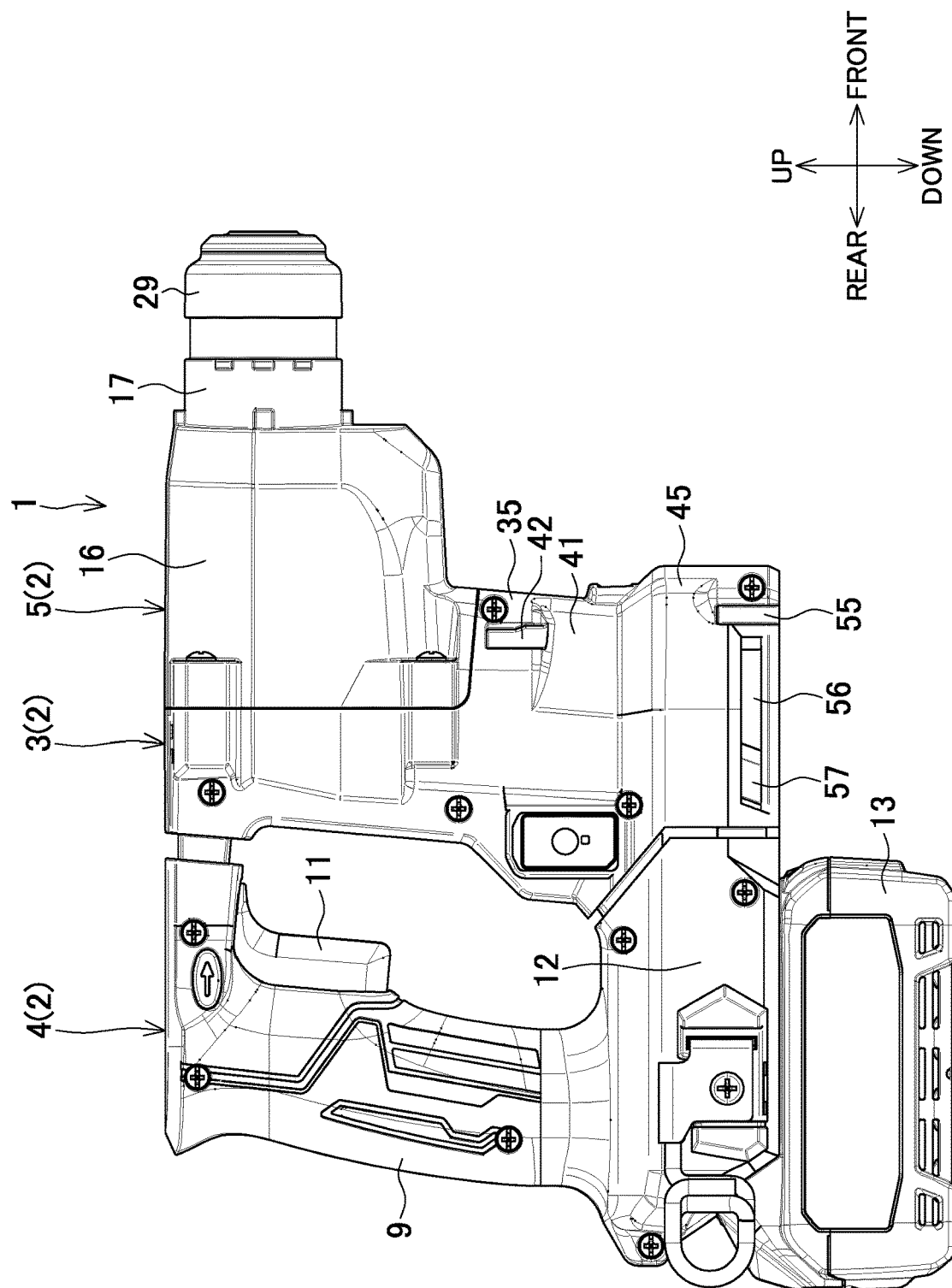
FIG. 2 is a side view of the hammer drill.
Figure 3:
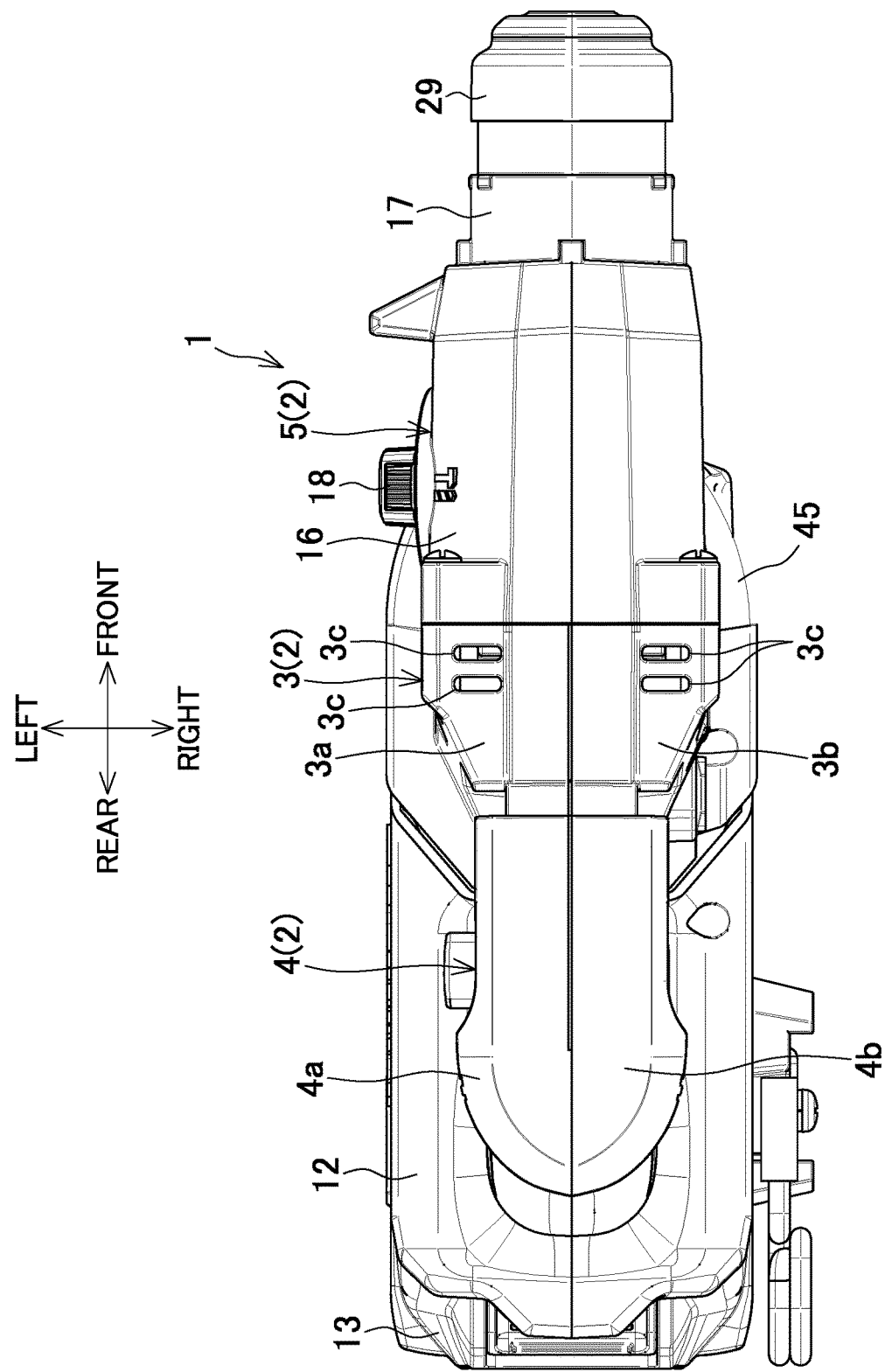
FIG. 3 is a plan view of the hammer drill.
Figure 4:
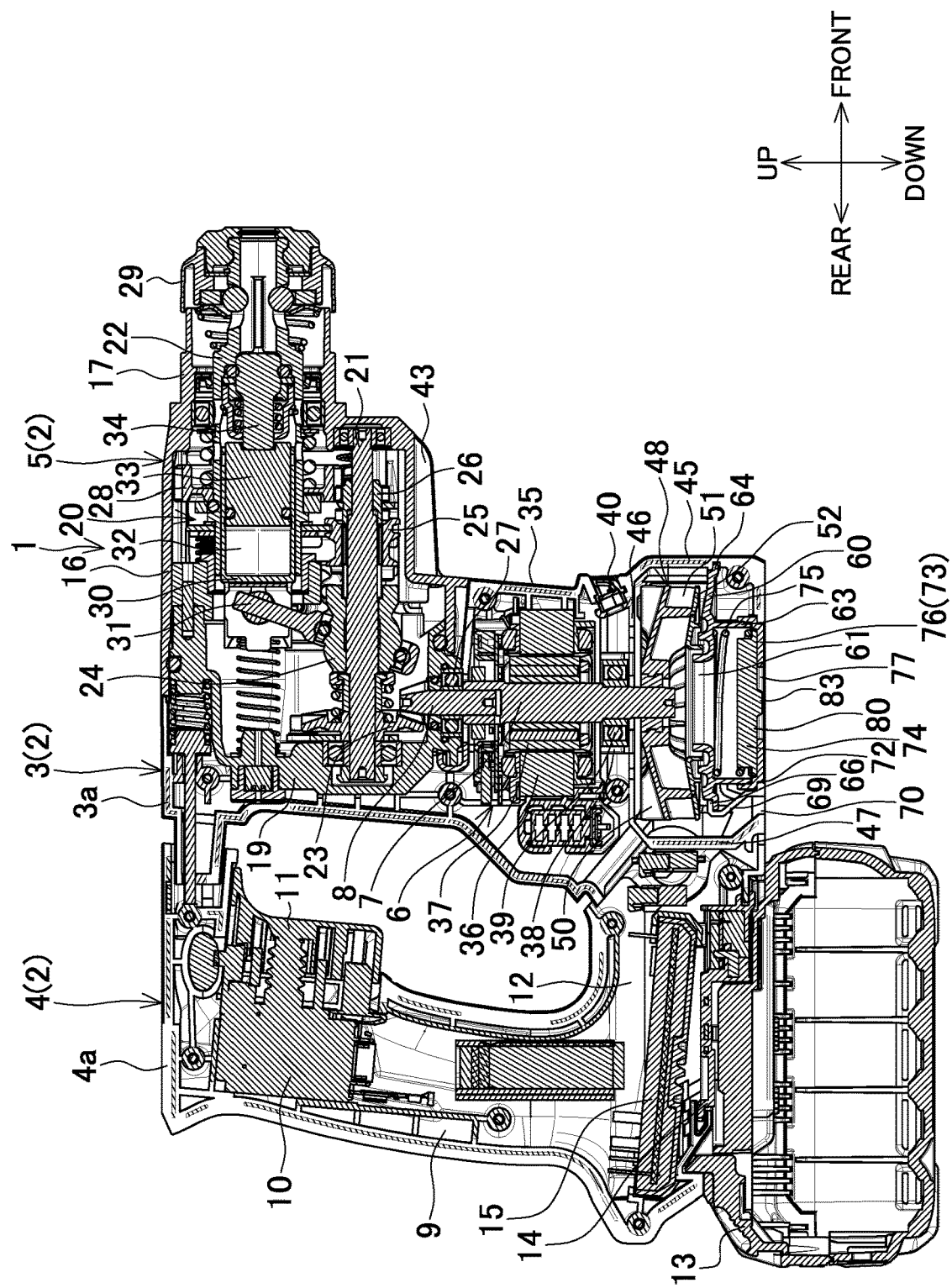
FIG. 4 is a center vertical cross-sectional view of the hammer drill.

FIG. 1 is a perspective view from below a hammer drill that is one example of an impact tool, FIG. 2 is a side view, FIG. 3 is a plan view, and FIG. 4 is a center vertical cross-sectional view of the hammer drill.

A hammer drill 1 includes a housing 2 that forms an outer wall. The housing 2 includes a main body housing 3, a rear housing 4, and a front housing 5.

The main body housing 3 houses a motor 6 in a lower portion and couples the front housing 5 in an upper portion. The motor 6 is housed in a posture with a rotation shaft 7 being directed in an up-down direction. At an upper end of the rotation shaft 7, a pinion 8 is mounted upward. The main body housing 3 is formed by screwing a left half housing 3a and a right half housing 3b. On an upper surface of the main body housing 3, a plurality of upper air inlets 3c, 3c, . . . are formed.

The rear housing 4 includes a grip portion 9 extending in the up-down direction and is coupled to the main body housing 3 in a loop shape. The rear housing 4 is formed by screwing a left half housing 4a and a right half housing 4b. In an upper portion of the grip portion 9, a switch 10 is provided to include a trigger 11 projecting forward. In a lower portion of the grip portion 9, a battery mounting portion 12 is formed. A battery pack 13 is slidingly mounted to the battery mounting portion 12 from the rear. Inside the battery mounting portion 12, a terminal block 14 that is electrically coupled to the battery pack 13 is held. On an upper side of the terminal block 14, a controller 15 is housed.

The front housing 5 has a cylindrical shape and includes a rear cylinder portion 16 and a front cylinder portion 17. The rear cylinder portion 16 has an approximately quadrangular shape with lateral cross-sectional surface being extending in the up-down direction and is screwed to the upper portion of the main body housing 3 from the front. The front cylinder portion 17, which has a circular lateral cross-sectional surface, projects forward from an eccentric position to an upper side of the rear cylinder portion 16. The rear cylinder portion 16 has a left side surface where a switching knob 18 for an operation mode is disposed.

In an upper portion inside the main body housing 3, an inner housing 19 that is mounted to the rear cylinder portion 16 is disposed. In insides of the front housing 5 and the inner housing 19, an impact mechanism unit 20 is disposed.

The impact mechanism unit 20 includes an intermediate shaft 21 and a tool holder 22 each disposed in a front-rear direction. The intermediate shaft 21 is rotatably supported on a lower side inside the front housing 5 and the inner housing 19. The intermediate shaft 21 is provided with a first gear 23, a boss sleeve 24, a clutch 25, and a second gear 26 from the rear. The pinion 8 of the rotation shaft 7 passes through the inner housing 19 from below to be supported by a bearing 27 and is engaged with the first gear 23.

The tool holder 22 has a cylindrical shape and is rotatably supported in coaxial with the front cylinder portion 17 above the intermediate shaft 21. The tool holder 22 has an intermediate portion where a third gear 28 is disposed. The third gear 28 is engaged with the second gear 26 on the intermediate shaft 21. The tool holder 22 has a front end that projects forward from the front cylinder portion 17. At the front end of the tool holder 22, an operation sleeve 29 to which a bit is attachable/detachable is disposed.

The tool holder 22 has a rear portion where a piston cylinder 30 is loosely inserted so as to be movable in the front-rear direction. The piston cylinder 30 has a rear end where an arm 31 is coupled. The arm 31 is externally mounted to the boss sleeve 24 via a swash bearing with an axial line being inclined and is swingable in the front-rear direction. Inside the piston cylinder 30, a striker 33 is housed so as to be movable in the front-rear direction via an air chamber 32. Inside the tool holder 22 in front of the piston cylinder 30, an impact bolt 34 is disposed.

Below the front housing 5 in the main body housing 3, a motor housing portion 35 having a cylindrical shape is formed. The motor housing portion 35 houses the motor 6. The motor 6 is a brushless motor including a stator 36 and a rotor 37 that has the rotation shaft 7. A lower portion of the rotation shaft 7 passes through a bearing holder 38 formed inside the motor housing portion 35 and is supported by a bearing 39. On a front surface of the motor housing portion 35 in front of the bearing holder 38, a light 40 that irradiates the front of the tool holder 22 is disposed.

From the front surface to the side surface of the motor housing portion 35 on the left and right of the light 40, a pair of left and right chamfering portions 41, 41 are formed. On an upper side of the chamfering portions 41, 41, a pair of left and right upper engaging portions 42, 42 are formed. Each upper engaging portion 42 has a groove shape that is cut in an outer surface of the motor housing portion 35 toward an upper side from the chamfering portion 41 and has openings on the side surface and the lower surface. A lower portion of each upper engaging portion 42 has a tapered shape where a groove width becomes wider toward the lower side. The upper engaging portions 42, 42 are used for mounting a dust collection attachment 90, which will be described later. In the center of the left and right of a lower surface of the rear cylinder portion 16 on the upper side with respect to the upper engaging portions 42, 42, an engaging groove 43 extending in the front-rear direction is formed. A front end of the engaging groove 43 is opened to the front.

Figure 5:
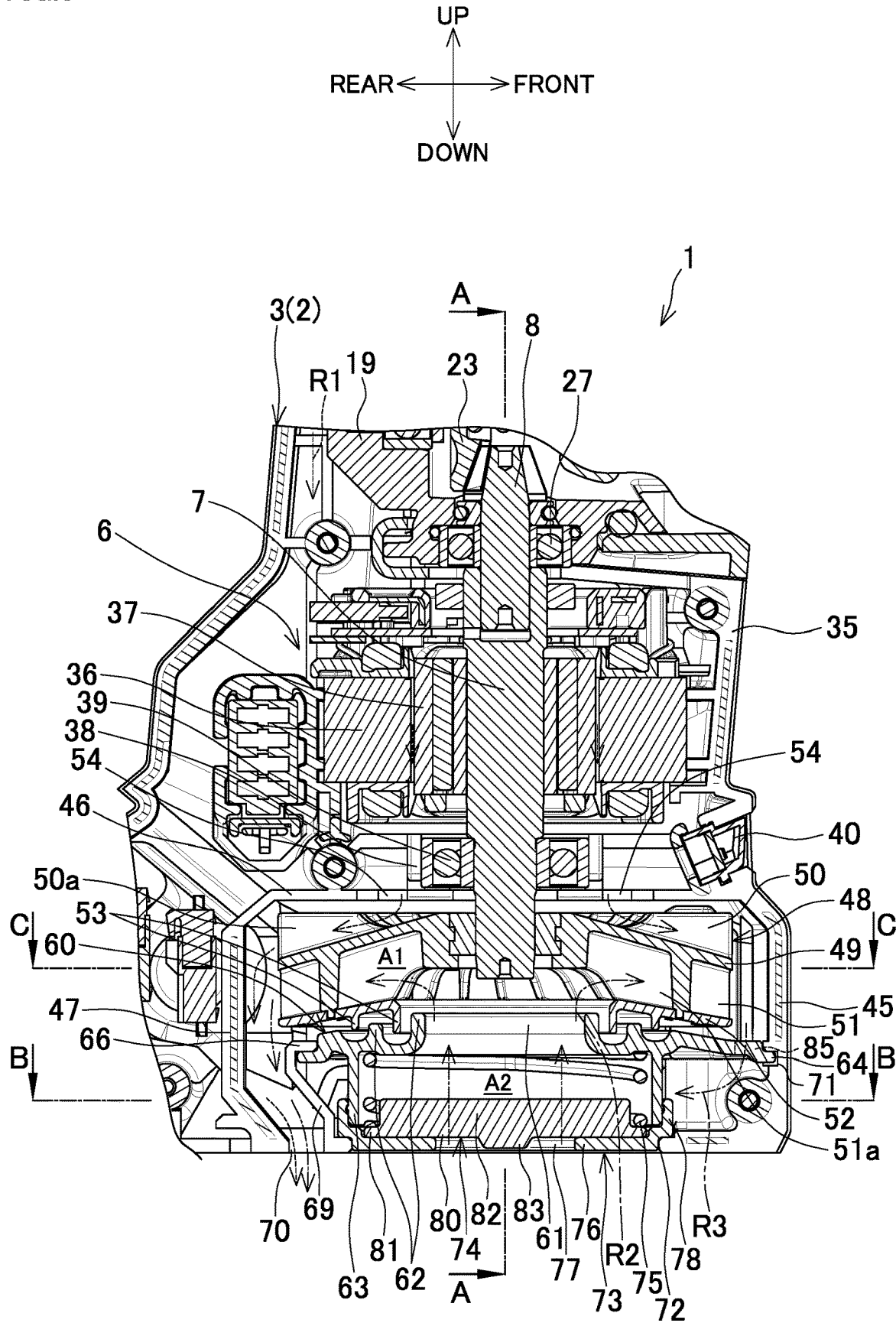
FIG. 5 is an enlarged view of a motor housing portion and a fan housing portion in FIG. 4.

On the lower side of the motor housing portion 35, a fan housing portion 45 is formed. As illustrated in FIG. 5, the fan housing portion 45 is partitioned from the motor housing portion 35 and the battery mounting portion 12 inside the main body housing 3 by an upper plate portion 46 and a rear plate portion 47. The upper plate portion 46 has a plate shape in the front-rear and right-left directions that partitions inside the main body housing 3 into the upper and lower sides. On the upper surface of the upper plate portion 46, the bearing holder 38 is integrally formed. The rear plate portion 47 has a plate shape in the up-down and right-left directions that extend downward from a rear end of the upper plate portion 46 and partitions inside the main body housing 3 into the front side and the rear side.

A lower end of the rotation shaft 7 passes through the upper plate portion 46 to project inside the fan housing portion 45. Inside the fan housing portion 45, a double fan 48 is orthogonally mounted to the lower end of the rotation shaft 7. The double fan 48 has a partition plate 49 having a circular shape in a plan view as a boundary between an upper side and a lower side. The double fan 48 is provided with a motor cooling fan 50 on the upper side and a dust collection fan 51 on the lower side. Both fans 50, 51 are centrifugal fans. An upper end of each fin 50a of the motor cooling fan 50 is close to the upper plate portion 46. The dust collection fan 51 has a lower portion where a cover 52 is disposed to cover each fin 51a from a lower side except a center portion. Two ring-shaped upper ribs 53, 53 are formed concentrically to be directed downward on an inner peripheral edge and the outside in the radial direction of the cover 52.

Above the motor cooling fan 50, the upper plate portion 46 is provided with upper ventilation ports 54, 54 formed in the right-left direction, and the upper ventilation ports 54, 54 open to the front and rear sides of the bearing holder 38.

Figure 6:
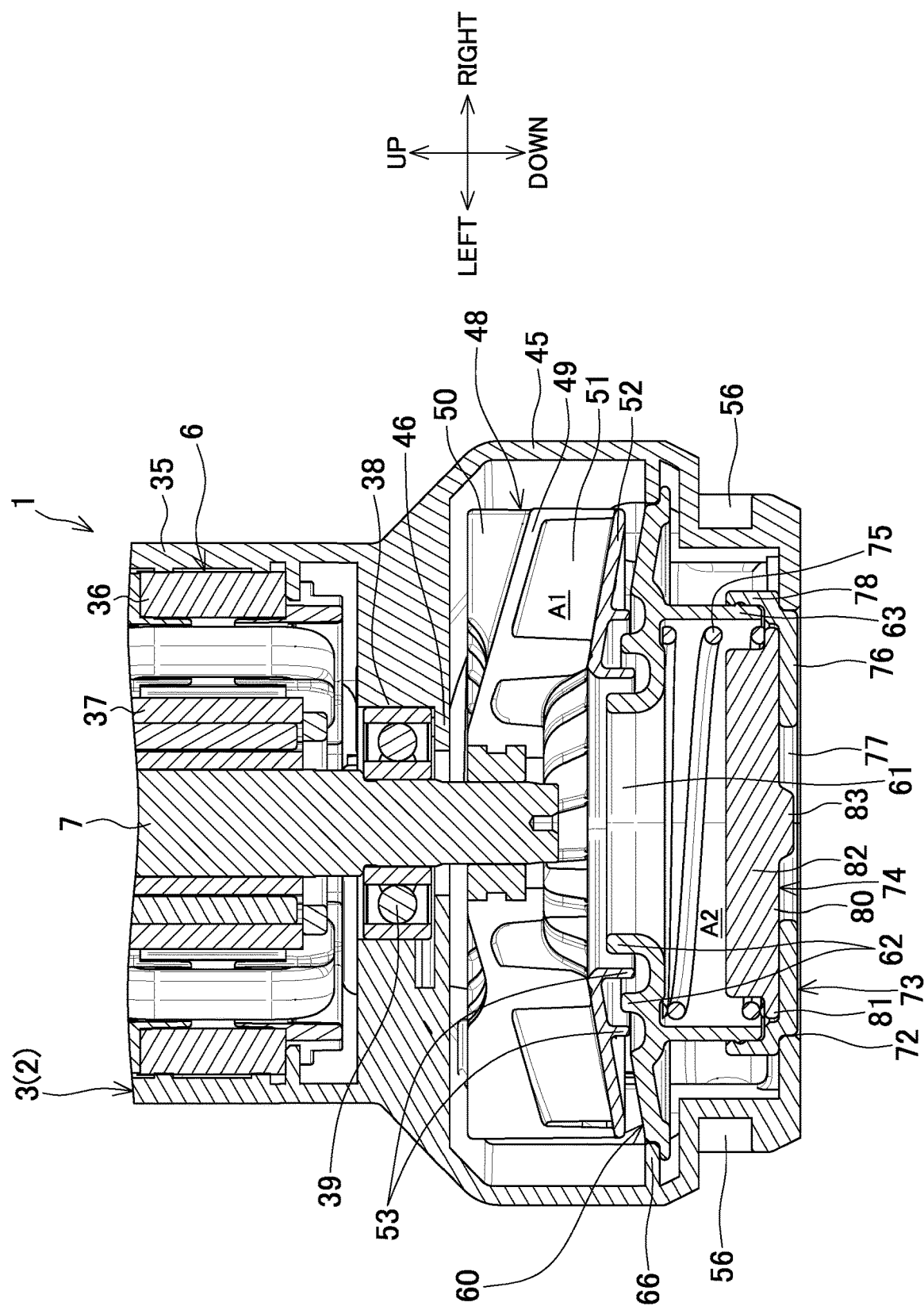
FIG. 6 is a partial cross-sectional view taken along a line A-A in FIG. 5.

As also illustrated in FIG. 6, the fan housing portion 45 has a right-left width larger than that of the motor housing portion 35. The fan housing portion 45 also has a front surface that projects out to the front with respect to the front surface of the motor housing portion 35. The fan housing portion 45 has the right-left width that is approximately equal to right-left widths of the battery mounting portion 12 and the battery pack 13.

At positions close to the front surface on the left and right side surfaces of the fan housing portion 45, a pair of left and right lower engaging portions 55, 55 is formed. The lower engaging portions 55, 55 have groove shapes that are cut from a lower surface of the fan housing portion 45 toward the upper side and have openings on the side surfaces and the lower surface. The lower engaging portions 55, 55 are also used for mounting the dust collection attachment 90. While the lower engaging portions 55, 55 are parallel to the upper engaging portions 42, 42, the lower engaging portions 55, 55 are formed at the positions in the front with respect to the upper engaging portions 42, 42 and on the outer side in the right-left direction with respect to the upper engaging portions 42, 42.

Figure 7:
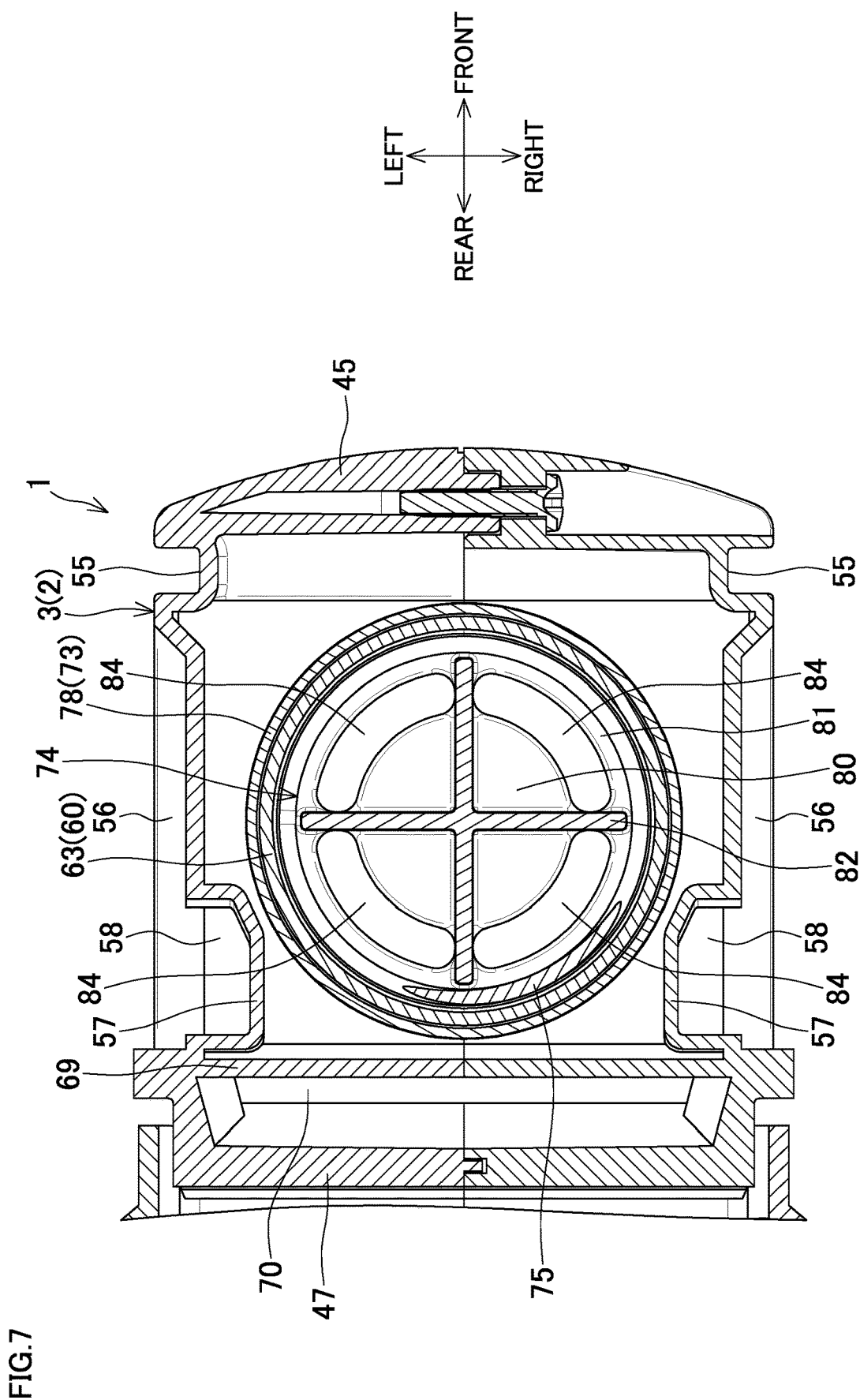
FIG. 7 is a partial cross-sectional view taken along a line B-B in FIG. 5.

As illustrated in FIG. 7, locking grooves 56, 56 extending in the front-rear direction are formed behind the lower engaging portions 55, 55 on the lower left and right side surfaces of the fan housing portion 45. Behind the locking grooves 56, 56, protruding portions 57, 57 are formed. The protruding portions 57, 57 have the surfaces on the left and right back sides that protrude into the inner portion side of the fan housing portion 45. On upper and lower sides of each protruding portion 57, side exhaust outlets 58, 58 are formed. The side exhaust outlets 58, 58 have slit shapes and communicate the inside of the fan housing portion 45 with the inside of the locking groove 56. As illustrated in FIG. 6, the left and right lower side surfaces of the fan housing portion 45, where the locking grooves 56, 56 are formed, have tapered surfaces, the right-left width of which becomes narrower toward the lower side.

Figure 8:
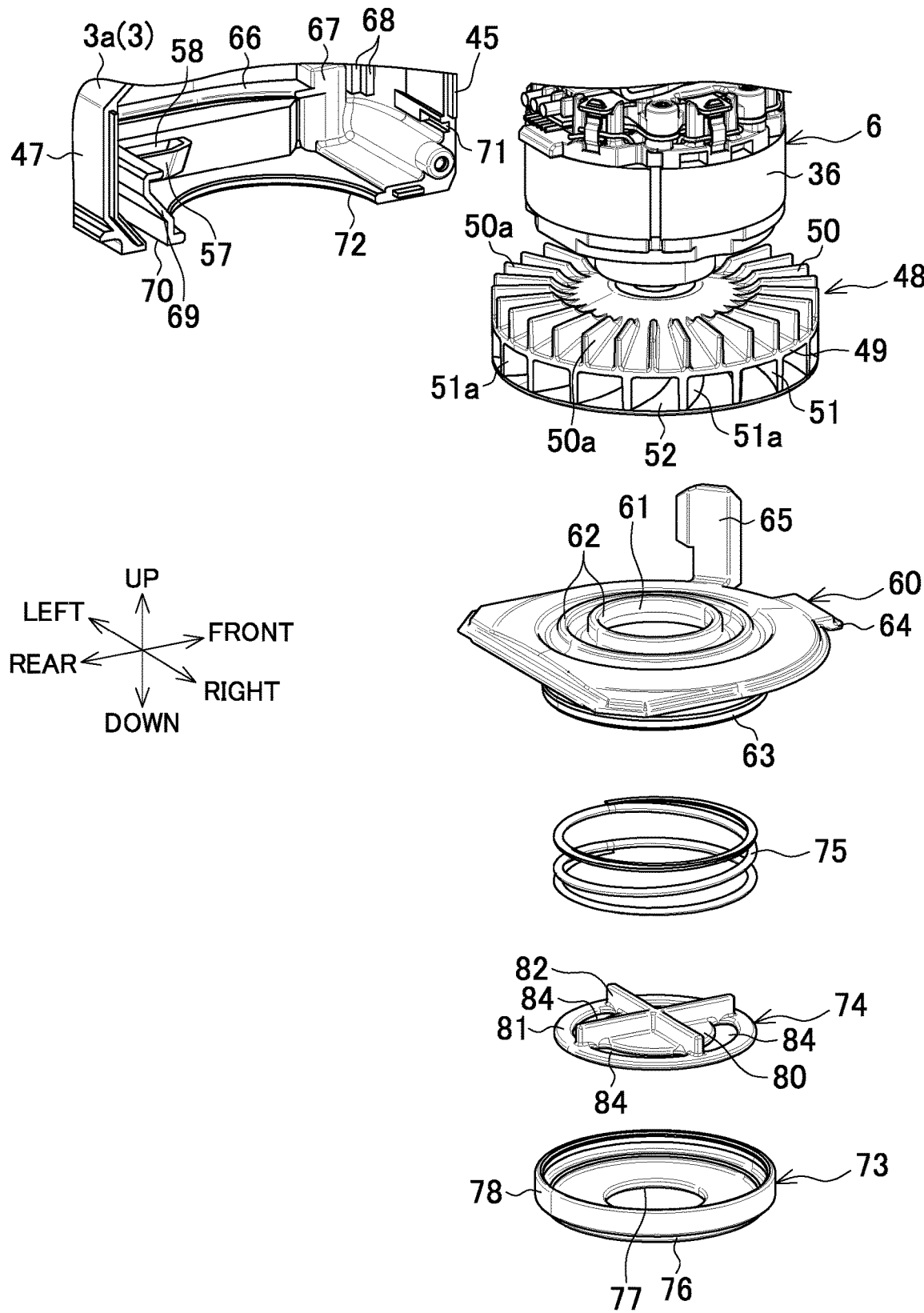
FIG. 8 is an exploded perspective view from above an inside of the fan housing portion.
Figure 9:
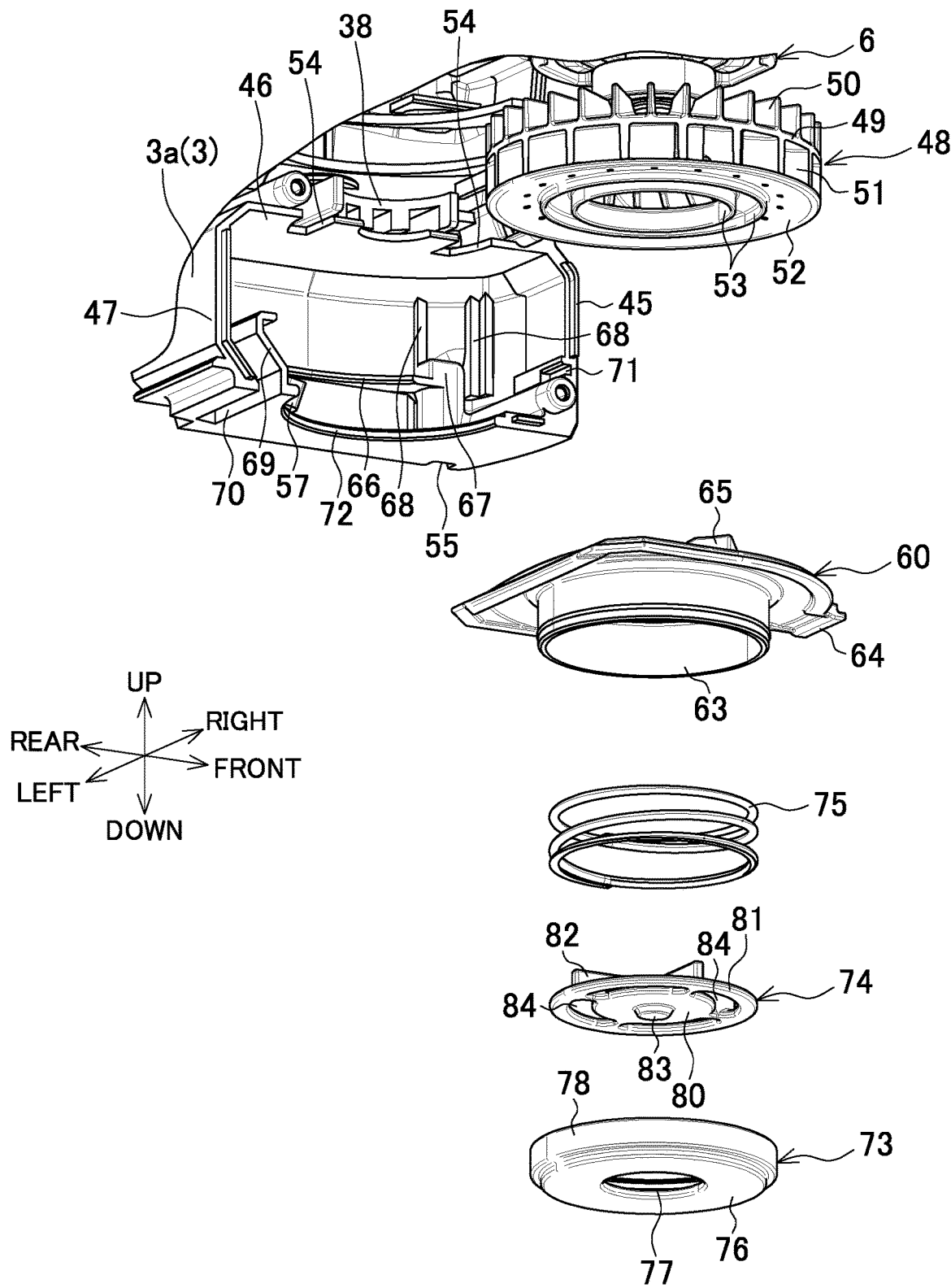
FIG. 9 is an exploded perspective view from below an inside of the fan housing portion.

Below the double fan 48 inside the fan housing portion 45, a baffle plate 60 is disposed. As illustrated in FIGS. 8 and 9, the baffle plate 60 has an approximately circular shape in plan view on a front side and an approximately quadrangular shape in plan view on a rear side. In a center of an approximately circular portion of the baffle plate 60, a circular lower ventilation port 61 is formed. On an inner peripheral edge and the outside in the radial direction of the lower ventilation port 61, two ring-shaped lower ribs 62, 62 are concentrically formed so as to be directed upward.

On a lower surface of the baffle plate 60, a lower cylinder portion 63 is formed so as to be directed downward. The lower cylinder portion 63 is coaxial with the lower ventilation port 61 and has a diameter larger than the lower ventilation port 61. At the front end of the baffle plate 60, a lock piece 64 that projects into the front is formed. On a left side of the lock piece 64, a semi-cylindrical portion 65 that stands in the upper direction is formed. The semi-cylindrical portion 65 is formed with an opening side being directed outside in the radial direction of the baffle plate 60.

Figure 10:
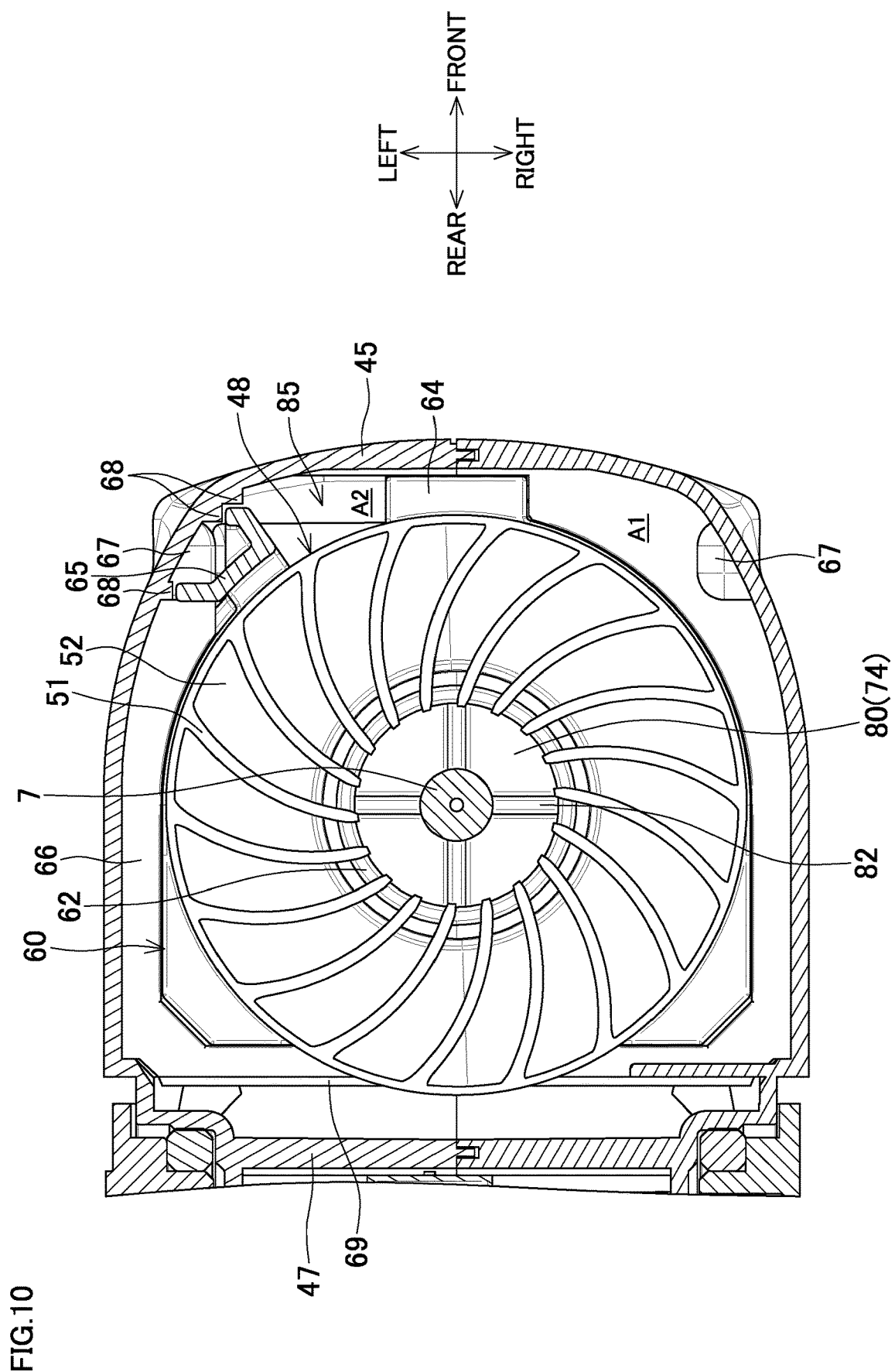
FIG. 10 is a partial cross-sectional view taken along a line C-C in FIG. 5.

Inside the fan housing portion 45, a receiving rib 66 of the baffle plate 60 is formed. As illustrated in FIG. 10, above the left and right locking grooves 56, 56, the receiving rib 66 is formed so as to run around the outer peripheral edge of the rear portion, the left and right, and the front right side of the baffle plate 60. The left and right and the front right side of the receiving rib 66 are disposed so as to protrude from the inner surface of the fan housing portion 45. The left side of the receiving rib 66 is coupled to a bulging portion 67 that bulges inside the fan housing portion 45 so as to form the lower engaging portion 55. On an upper side of the bulging portion 67, a plurality of longitudinal ribs 68, 68, . . . are formed in the up-down direction. The front right side of the receiving rib 66 is formed up to the right side of the lock piece 64 of the baffle plate 60.

The receiving rib 66 has a rear portion that is formed on an upper end of a partition wall 69 formed upright from the bottom surface of the fan housing portion 45 on the front side with respect to the rear plate portion 47. The partition wall 69 partitions the inside of the fan housing portion 45 into the front and rear below the double fan 48. On a bottom surface of the fan housing portion 45 on the rear side of the partition wall 69, a bottom surface exhaust outlet 70 that extends in the right-left direction is formed.

On the front inner surface of the fan housing portion 45, a groove 71 where the lock piece 64 is locked is formed.

On the bottom surface of the fan housing portion 45 in the front of the bottom surface exhaust outlet 70, a circular hole 72 is formed. The circular hole 72 is formed to be coaxial with the lower cylinder portion 63 of the baffle plate 60 and to have approximately the same diameter. A cap 73 is fitted into the circular hole 72 from the inside. Between the cap 73 and the baffle plate 60, a shutter 74 and a coil spring 75 are interposed.

The cap 73 has a fitting portion 76 that fits into the circular hole 72 on its lower surface. In a center of the fitting portion 76, a circular lower air inlet 77 is formed. On an outer periphery of the cap 73, a peripheral wall portion 78 where the lower end of the lower cylinder portion 63 of the baffle plate 60 is inserted and fitted is formed.

The shutter 74 has a circular plate portion 80 in the center portion, a ring portion 81 outside the circular plate portion 80, and a cross rib 82 that couples the circular plate portion 80 to the ring portion 81. The circular plate portion 80 has a diameter larger than the lower air inlet 77 of the cap 73 and has a circular protrusion 83 that projects downward at the center of the lower surface. The ring portion 81 has an inner diameter larger than the outer diameter of the circular plate portion 80 and is disposed concentrically with the circular plate portion 80. The ring portion 81 has a diameter smaller than an inner diameter of the lower cylinder portion 63 and can be fitted into the inside of the peripheral wall portion 78 of the cap 73. The cross rib 82 is disposed concentrically on the upper surface of the circular plate portion 80 and the ring portion 81 and couples both the circular plate portion 80 and the ring portion 81. Accordingly, between the circular plate portion 80 and the ring portion 81, four arc-shaped through holes 84, 84, . . . , are formed at equal intervals in the circumferential direction.

The coil spring 75 is housed inside the lower cylinder portion 63. The coil spring 75 has a lower end that abuts on the upper surface of the ring portion 81 on the outside of the cross rib 82 of the shutter 74. The coil spring 75 has an upper end that abuts on the lower surface of the baffle plate 60.

In the fan housing portion 45, first, the baffle plate 60 and the cap 73 that hold the shutter 74 and the coil spring 75 are assembled between the receiving rib 66 of the left half housing 3a and the bottom surface of the fan housing portion 45. Here, the baffle plate 60 is assembled such that the semi-cylindrical portion 65 abuts on the longitudinal ribs 68, 68 on the bulging portion 67 on the left side and the lock piece 64 is locked into the groove 71. When the right half housing 3b is assembled in the state, by a repulsion force of the coil spring 75, the baffle plate 60 is biased to a position where the left and right and the rear portions abut on the receiving rib 66 from the lower side. Simultaneously, the shutter 74 is biased downward together with the cap 73. Accordingly, the cap 73 is pushed to a position where the fitting portion 76 fits to the circular hole 72. The shutter 74 is pushed to a position where the circular plate portion 80 closes the lower air inlet 77.

In the state, the lower ribs 62, 62 of the baffle plate 60 and the upper ribs 53, 53 of the cover 52 of the dust collection fan 51 alternately overlap in a non-contact manner with one another in the radial direction. Accordingly, a labyrinth is formed between the dust collection fan 51 and the baffle plate 60.

Thus, as illustrated in FIGS. 5 and 6, by the baffle plate 60 positioned by the receiving rib 66, the inside of the fan housing portion 45 is partitioned into an upper space A1 and a lower space A2 of the baffle plate 60. The upper space A1 communicates with the rear of the partition wall 69 and the bottom surface exhaust outlet 70. The lower space A2 is formed in front of the partition wall 69 and communicates with the left and right side exhaust outlets 58, 58. Between the lock piece 64 and the semi-cylindrical portion 65, a communication port 85 (FIG. 10) is formed to cause the upper space A1 to communicate with the lower space A2.

Thus, inside the main body housing 3, a motor cooling flow passage R1 is formed for air flowing by rotation of the motor cooling fan 50 of the double fan 48. In the motor cooling flow passage R1, as indicated by a dotted arrow in FIG. 5, air suctioned from the upper air inlet 3c on the upper surface of the main body housing 3 passes between the main body housing 3 and, the front housing 5 and the inner housing 19, and the motor 6. Subsequently, the air enters the upper space A1 of the fan housing portion 45 from the upper ventilation port 54 and is discharged from the bottom surface exhaust outlet 70.

On the other hand, inside the fan housing portion 45, a power-tool-side dust collection flow passage R2 is formed for air flowing by rotation of the dust collection fan 51 of the double fan 48. In the power-tool-side dust collection flow passage R2, the shutter 74 moves up against biasing of the coil spring 75 to open the lower air inlet 77, and air is suctioned inside the lower space A2 from the lower air inlet 77. As indicated by one dot chain lines in FIG. 5, the suctioned air passes the through hole 84 of the shutter 74, the lower cylinder portion 63 and the lower ventilation port 61 of the baffle plate 60 to enter the upper space A1. Then, similarly to the motor cooling flow passage R1, the air flows from the outside in the radial direction of the dust collection fan 51 to the bottom surface exhaust outlet 70.

The motor cooling flow passage R1 and the power-tool-side dust collection flow passage R2 include a branch flow passage R3. In the branch flow passage R3, as indicated by two-dot chain lines in FIG. 5, a part of the air having entered the upper space A1 enters the lower space A2 from the outside of the double fan 48 in the radial direction through the communication port 85. Then, the air passes the outer periphery of the lower cylinder portion 63 of the baffle plate 60 and is discharged from the side exhaust outlets 58, 58.

A description of a dust collection attachment is provided below.

Figure 11:
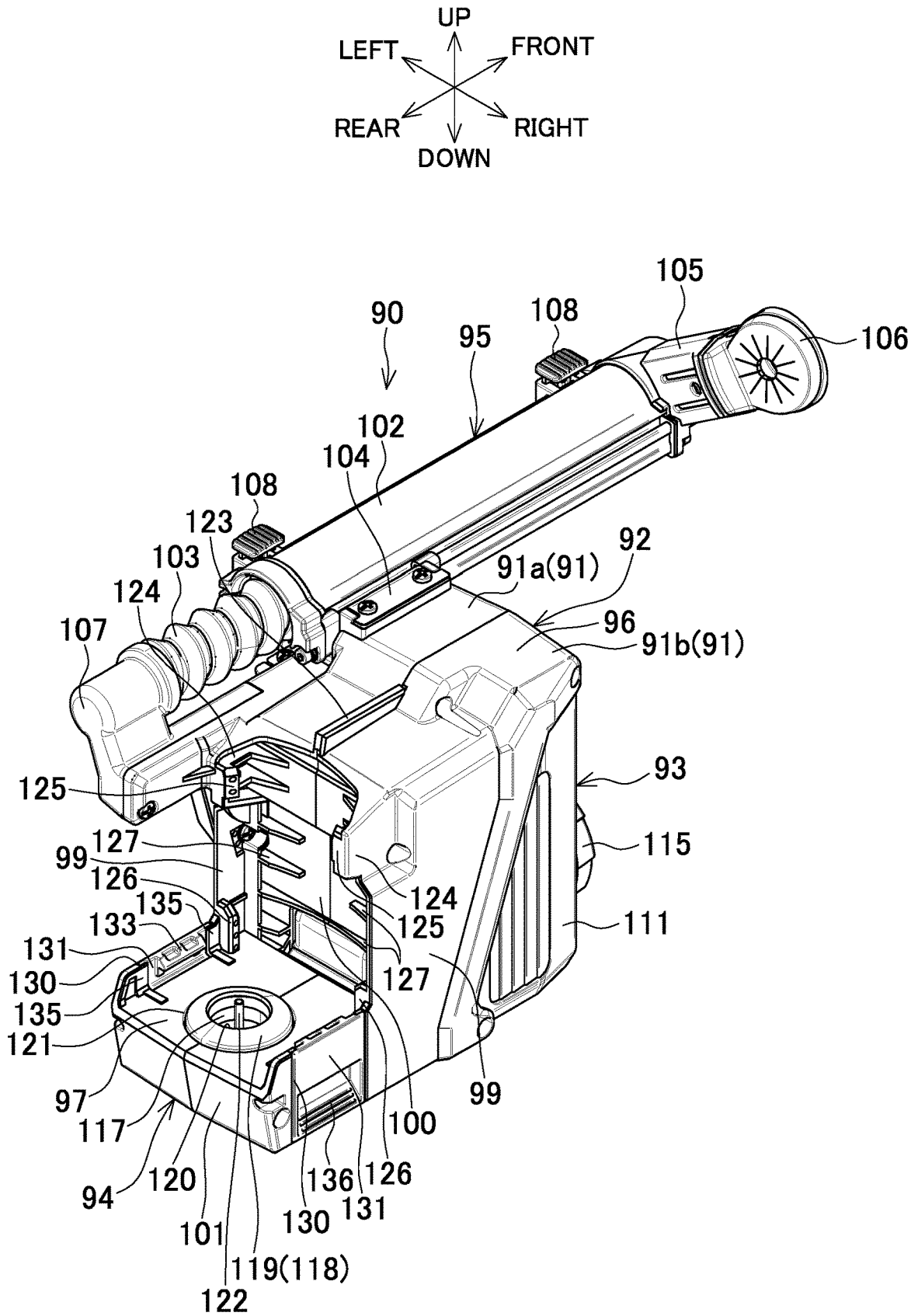
FIG. 11 is a perspective view from a rear of a dust collection attachment.
Figure 12:
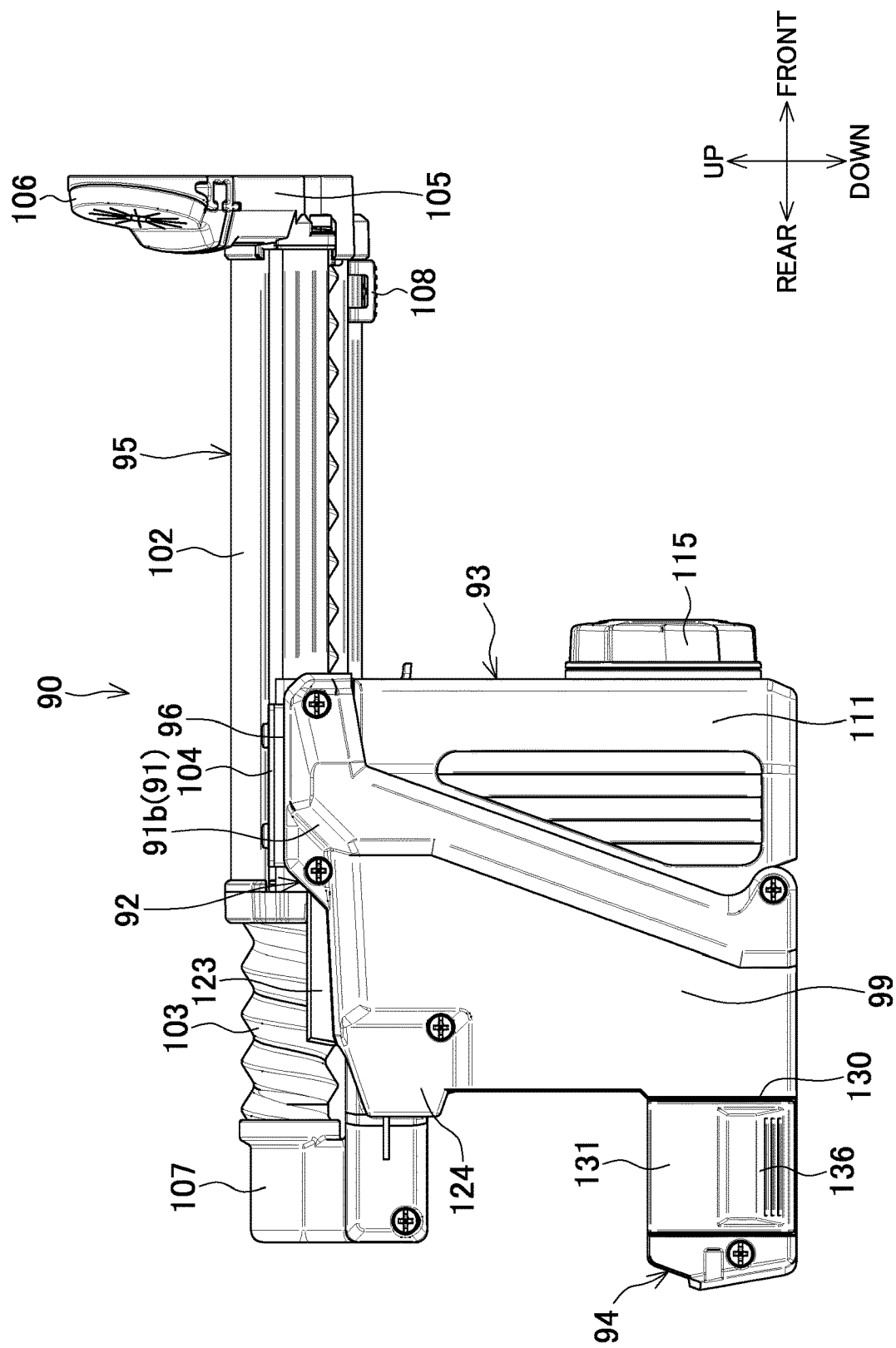
FIG. 12 is a side view of the dust collection attachment.
Figure 13:
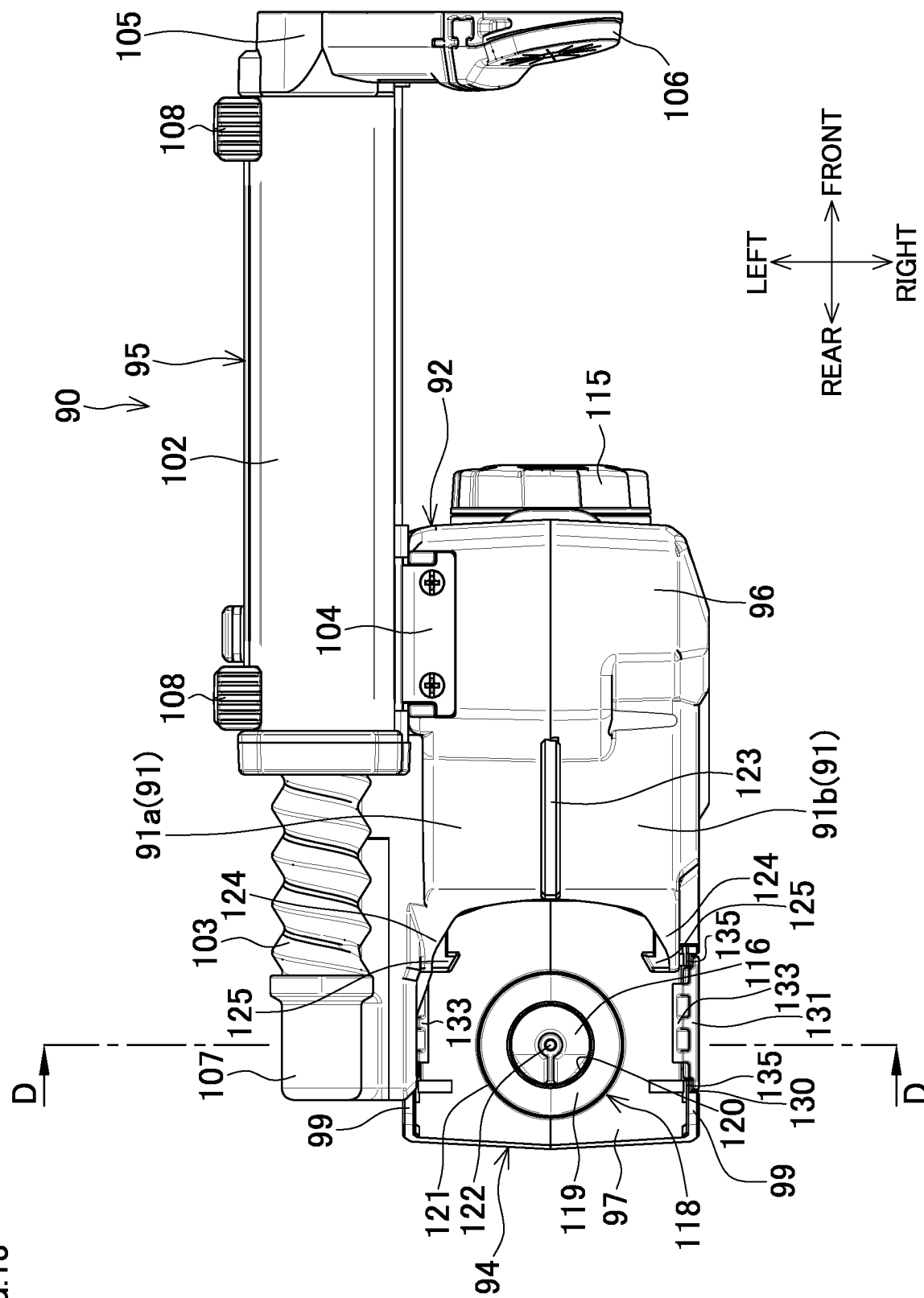
FIG. 13 is a plan view of the dust collection attachment.
Figure 14:
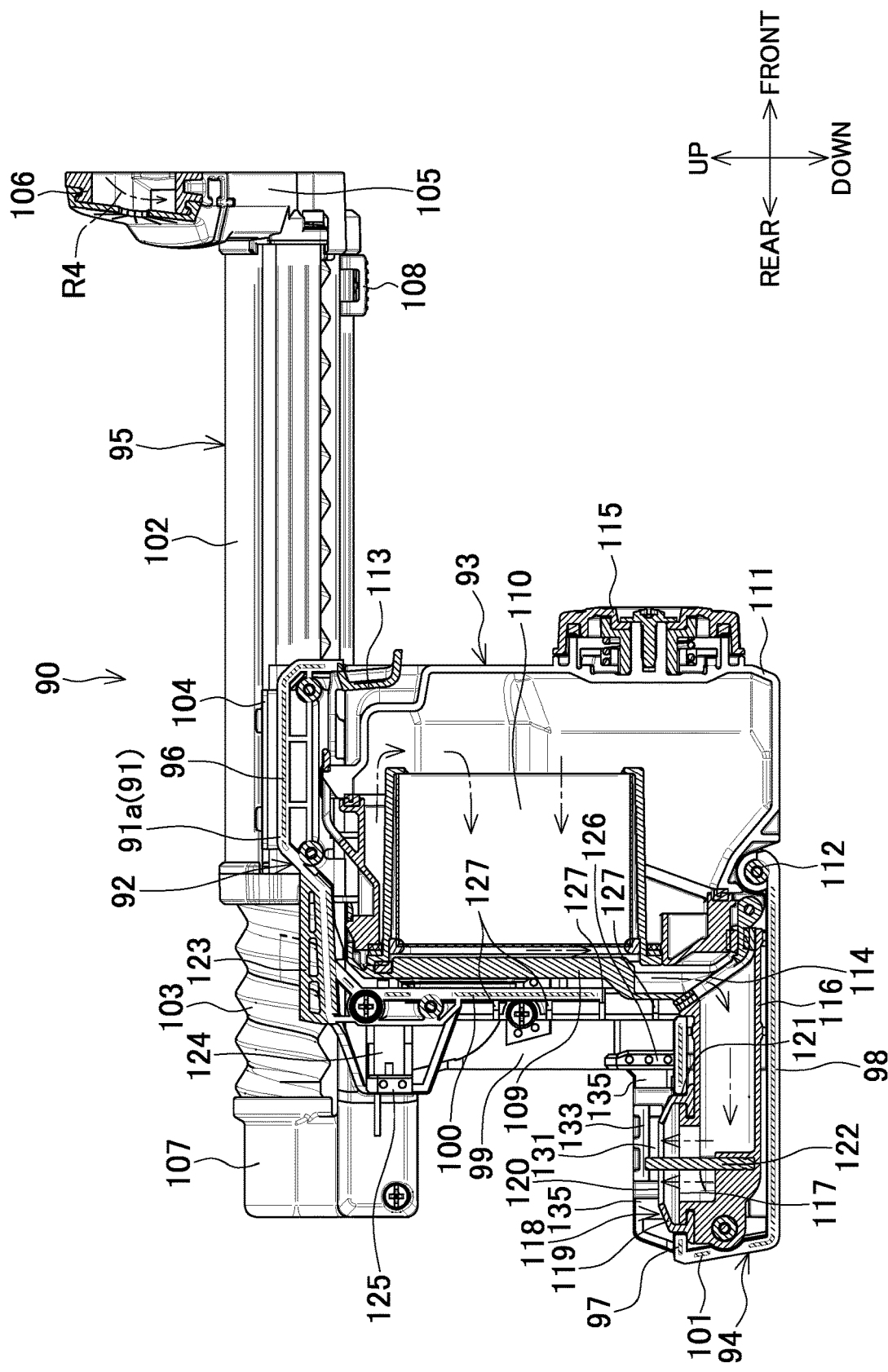
FIG. 14 is a center vertical cross-sectional view of the dust collection attachment.

FIG. 11 is a perspective view illustrating one example of the dust collection attachment (hereinafter simply referred to as "the attachment"). FIG. 12 is a side view of the attachment, FIG. 13 is a plan view, and FIG. 14 is a center vertical cross-sectional view of the attachment.

The attachment 90 includes an L-shaped casing 91 in side view. The casing 91 is formed by assembling left and right half casings 91a, 91b. On the front side of the casing 91, a main body portion 92 that includes a dust box 93 is disposed. On the rear side of the casing 91, a projecting portion 94 is disposed to project rearward from the lower portion of the main body portion 92. On the left upper portion of the main body portion 92, a sliding portion 95 projecting forward is disposed.

The casing 91 includes a front top plate 96, a rear top plate 97, a bottom plate 98, a pair of side plates 99, 99, a front back plate 100, and a rear back plate 101. The front top plate 96 forms an upper surface of the main body portion 92. The rear top plate 97 forms an upper surface of the projecting portion 94. The bottom plate 98 forms lower surfaces of the main body portion 92 and the projecting portion 94. The pair of the side plates 99, 99 forms side surfaces of the main body portion 92 and the projecting portion 94. The front back plate 100 forms a back surface of the main body portion 92. The rear back plate 101 forms a back surface of the projecting portion 94. A front of the main body portion 92 has an opening. The dust box 93 is removably attachable to the inside of the main body portion 92 from the front.

The sliding portion 95 includes a slide tube 102 and a flexible hose 103. The slide tube 102 is held to be movable back and forth by a guide metal fitting 104 disposed on the front top plate 96. The slide tube 102 has a distal end where a nozzle 105 including a suction opening 106 is orthogonally mounted. The suction opening 106 is located at a center in the right-left direction on the upper side of the main body portion 92.

The flexible hose 103 is loosely inserted into the slide tube 102 and has a front end that is coupled to a base end of the nozzle 105. The flexible hose 103 has a rear end that is coupled to an upstream end of a duct 107 projecting at a left rear portion of the main body portion 92. The flexible hose 103 integrally includes a spiral-shaped wire and is compressed between the nozzle 105 and the duct 107 so as to bias the slide tube 102 forward. The slide tube 102 slides an advance position and a retreat position that can be regulated by stoppers 108, 108 disposed on a side surface of the slide tube 102.

The duct 107 has a downstream end that is open inside the main body portion 92 and communicates with an inlet (not illustrated) disposed in the dust box 93. The dust box 93 includes a lid body 109 and a box main body 111. The lid body 109 has a filter 110, and the box main body 111 is hinged to the lid body 109 and covers the filter 110 from the front. The dust box 93 is mounted such that the lower surface of the box main body 111 is locked to a receiving shaft 112 disposed on a front end of the bottom plate 98 and a latching piece 113 projecting forward from the lid body 109 is elastically locked to a front end of the front top plate 96. The lid body 109 has a lower portion where an outlet 114 for the air after passing the filter 110 is disposed. On a front surface of the box main body 111, a vibration generator 115 is disposed. The vibration generator 115 is used for removing dust attached to the filter 110 by generating vibration in the box main body 111 by a rotating operation.

The projecting portion 94 is provided with an exhaust cylinder 116, a front end of which is coupled to the outlet 114. The exhaust cylinder 116 has a cornered cylinder shape that is bent upward after being extended rearward inside the projecting portion 94. On an upper surface of the rear end of the exhaust cylinder 116, an exhaust outlet 117 is formed. The exhaust outlet 117 is covered with a rubber cap 118. In the upper portion, the rubber cap 118 has a tapered seal portion 119, the diameter of which becomes smaller toward the upper side. The seal portion 119 has a center at which an opening 120 is formed to be coaxial with the exhaust outlet 117 and to have a diameter approximately the same as the exhaust outlet 117. The rubber cap 118 is fitted into a circular hole 121 disposed in the rear top plate 97 above the exhaust outlet 117. The seal portion 119 projects upward from the circular hole 121. Inside the rear end of the exhaust cylinder 116 on the lower side of the exhaust outlet 117, a pin 122 projecting upward is disposed. The pin 122 pass through the centers of the exhaust outlet 117 and the opening 120 of the rubber cap 118 and projects upward with respect to the rubber cap 118.

Thus, in the attachment 90, an attachment side dust collection flow passage R4 indicated by one dot chain line arrow in FIG. 14 is formed. In the attachment side dust collection flow passage R4, the air that has entered from the suction opening 106 flows into the inside of the dust box 93 from the nozzle 105 through the flexible hose 103 and the duct 107. Then, after passing through the filter 110, the air enters the exhaust cylinder 116 from the outlet 114 and is discharged upward from the exhaust outlet 117.

The front top plate 96 has an upper surface where a step, a rear portion of which becomes lower than its front portion, is formed. In the rear portion of the front top plate 96, the lower surface of the rear cylinder portion 16 in the front housing 5 of the hammer drill 1 can be mounted. At the center in the right-left direction of the rear portion, an engaging rail 123 is disposed to project in the front-rear direction. The engaging rail 123 corresponds to the engaging groove 43 disposed on the lower surface of the rear cylinder portion 16. The rear edge of the front top plate 96 has a curved shape with which the motor housing portion 35 of the hammer drill 1 matches. The rear upper end of the left and right side plates 99, 99 to be coupled to the rear edge of the front top plate 96 becomes a pair of arm portions 124, 124 having right-left widths narrower than those of the front portions and the lower portions of the side plates 99, 99. The arm portions 124, 124 have the right-left widths slightly larger than that of the upper portion of the motor housing portion 35. On the respective opposed surfaces of the arm portions 124, 124, upper projections 125, 125 that fit into the upper engaging portions 42, 42 disposed in the motor housing portion 35 are formed in the up-down direction.

Below the upper projections 125, 125, the left and right side plates 99, 99 have the right-left width slightly larger than that of the fan housing portion 45. On the respective lower opposed surfaces of the left and right side plates 99, 99 below the upper projections 125, 125, lower projections 126, 126 that fit into the lower engaging portions 55, 55 disposed in the fan housing portion 45 are formed in the up-down direction. Similarly to the front-rear position between the upper engaging portions 42, 42 and the lower engaging portions 55, 55, the lower projections 126, 126 are positioned in the front with respect to the upper projections 125, 125. In the front back plate 100, a plurality of ribs 127, 127, . . . having curved rear surfaces that match with the front surfaces of the motor housing portion 35 and the fan housing portion 45 are formed in the right-left direction with intervals in the up-down direction.

Figure 15:
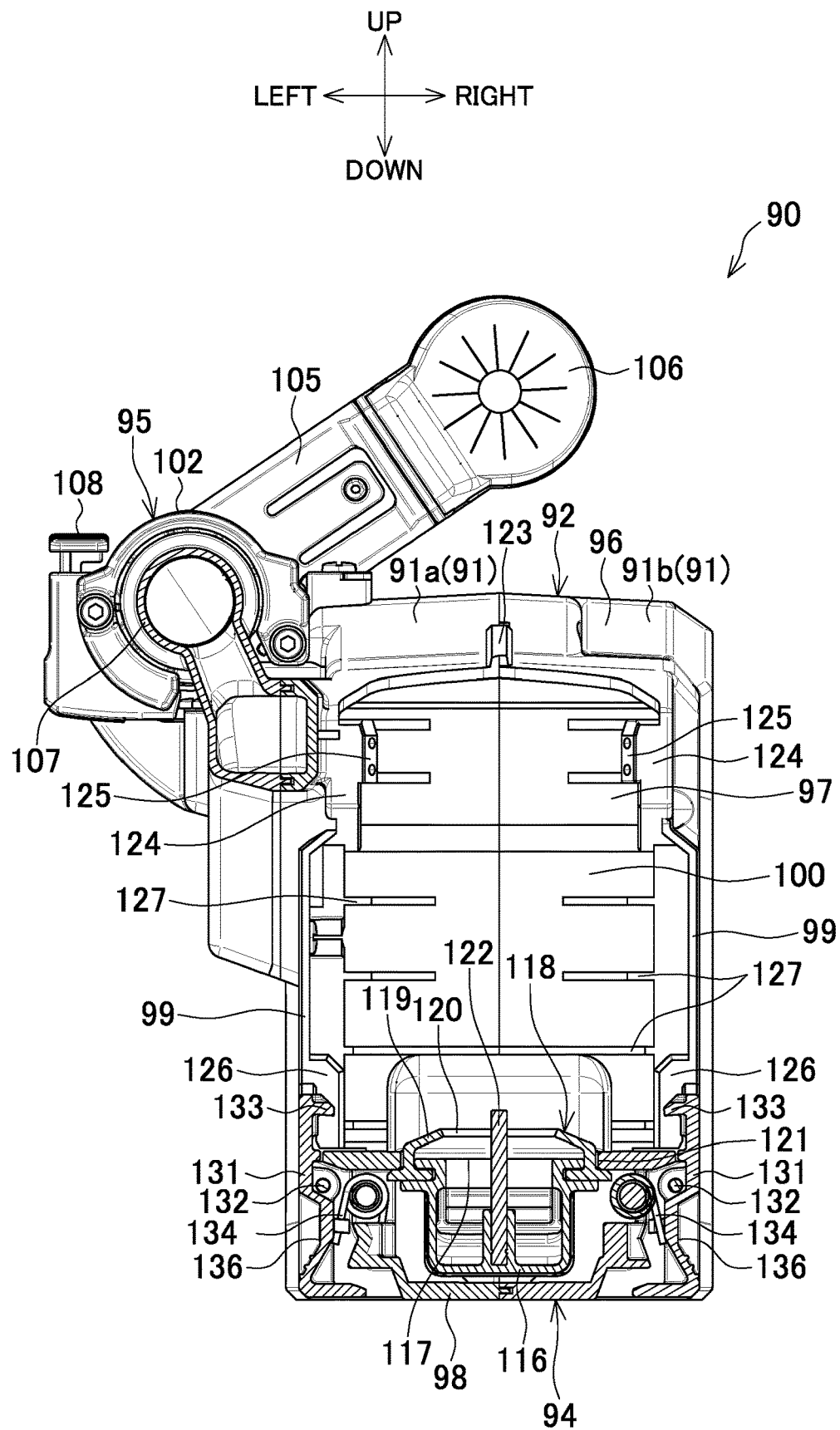
FIG. 15 is a cross-sectional view taken along a line D-D in FIG. 13.

The left and right side plates 99, 99 in the projecting portion 94 project upward with respect to the rear top plate 97. The side plates 99, 99 are provided with a pair of left and right cutout portions 130, 130 having a strip shape in the up-down direction. The cutout portions 130, 130 are provided with a pair of left and right hook plates 131, 131. As illustrated in FIG. 15, each hook plate 131 has the upper and lower ends that are supported swingably in the right-left direction by a support pin 132 bridged in the front-rear direction inside the cutout portion 130. Each hook plate 131 has an upper end where a claw portion 133 projecting inward is formed. The claw portion 133 has a barb shape in which its upper surface is inclined downward toward the center side on the left and right direction. Each hook plate 131 is rotationally biased in a direction where its upper end swings inward by a torsion spring 134 held on an inner side with respect to the support pin 132 inside the projecting portion 94. On the front-and-rear side edges of the cutout portion 130, stopper portions 135, 135 (FIGS. 13 and 14) on which the front-and-rear side edges of the hook plates 131 abut are formed. Accordingly, in a normal state, the hook plates 131, 131 are restricted from rotating in a parallel posture with the side plates 99, 99 where the upper-end side edges abut on the stopper portions 135. In the parallel posture, the claw portions 133, 133 project inward with respect to the side plates 99, 99. On the outer surfaces of the hook plates 131, 131 below the support pins 132, 132, fingerholds 136, 136 are disposed in a depressed manner.

A description of a dust collection system is provided below.

Figure 16:
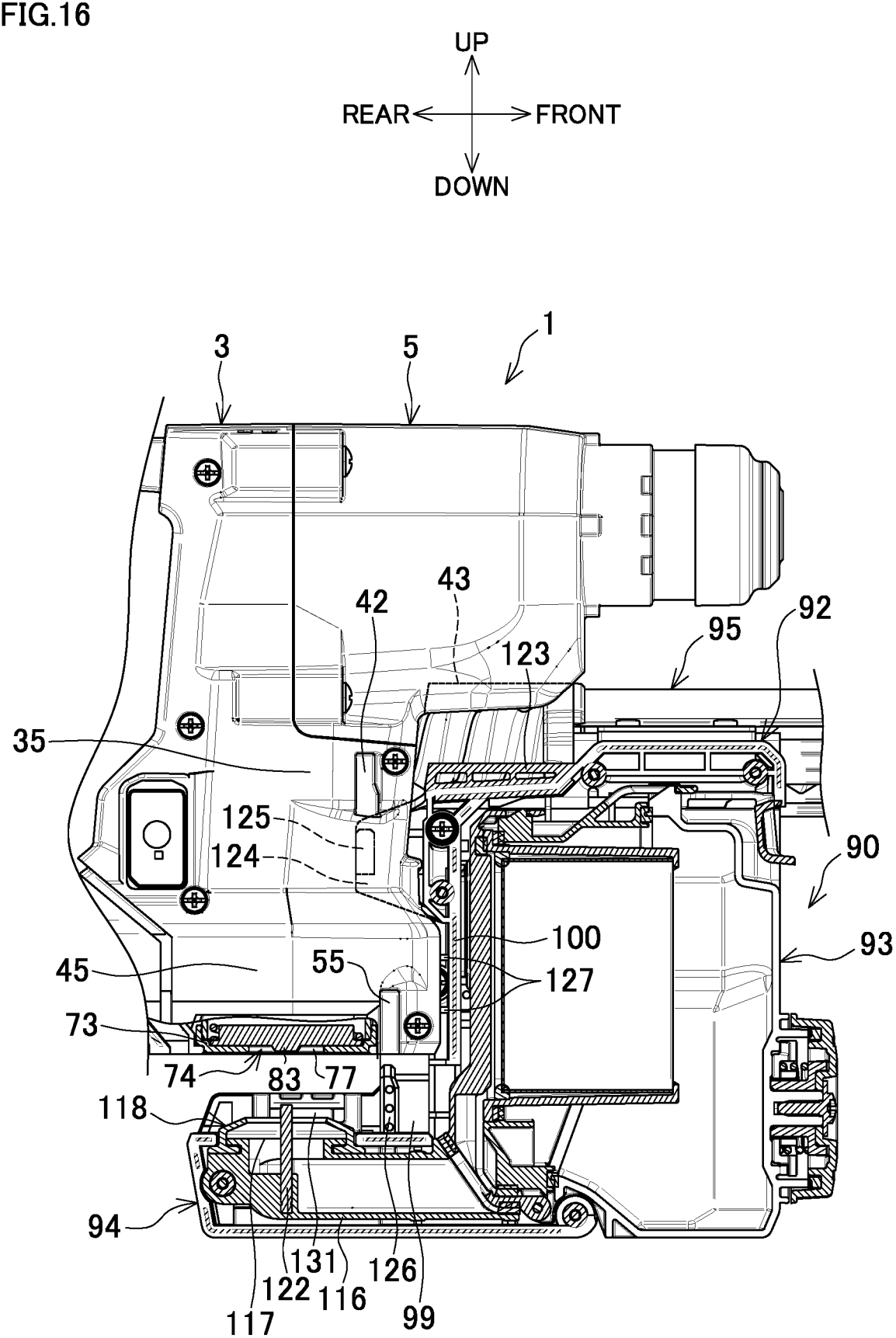
FIG. 16 is an explanatory drawing illustrating a set position in mounting the dust collection attachment to the hammer drill (the dust collection attachment and the hammer drill are partially illustrated by a center vertical cross-sectional surface).

The above-described attachment 90 is mounted to the above-described hammer drill 1. In the mounting, first, as illustrated in FIG. 16, the hammer drill 1 and the attachment 90 are disposed such that the projecting portion 94 is located below the fan housing portion 45, and the arm portions 124, 124 of the side plates 99, 99 are located below the upper engaging portions 42,42 of the motor housing portion 35. Then, the rib 127 of the front back plate 100 of the attachment 90 is brought into contact with the front surface of the fan housing portion 45. In the set position, the upper projections 125, 125 are positioned directly below the upper engaging portions 42, 42 and the lower projections 126, 126 are positioned directly below the lower engaging portions 55, 55. The engaging rail 123 is positioned directly below the engaging groove 43. In the state, the rubber cap 118 and the pin 122 of the projecting portion 94 are positioned directly below the shutter 74 that closes the lower air inlet 77.

In the above state, the attachment 90 is slid upward, or the hammer drill 1 is slid downward. By relatively moving with the attachment 90 or the hammer drill 1, the upper projections 125, 125 engage with the upper engaging portions 42, 42, and the lower projections 126, 126 engage with the lower engaging portions 55, 55 from the lower side, respectively. However, due to a difference in length in the up-down direction, timing of engagement differs between the upper side and the lower side. First, the lower projections 126, 126 engage with the lower engaging portions 55, 55, and then the upper projections 125, 125 engage with the upper engaging portions 42, 42. Accordingly, the preceding engagement between the lower projections 126, 126 and the lower engaging portions 55, 55 smoothly guide the upper projections 125, 125 to the engaging position with the upper engaging portions 42,42. Even when there is some rattling, the upper projections 125, 125 are surely guided to the upper engaging portions 42, 42 by the tapered shape of the lower portion of the upper engaging portions 42, 42. On the other hand, in association with the relative movement of the attachment 90, the engaging rail 123 also engages with the engaging groove 43 from the lower side.

Then, the upper projection 125 abuts on the upper surface of the upper engaging portion 42, the lower projection 126 abuts on the upper surface of the lower engaging portion 55, and the engaging rail 123 abuts on the lower surface of the front housing 5. Thus, the relative movement of the attachment 90 is restricted.

During the relative movement of the attachment 90, since the claw portions 133, 133 abut on the inclination of the lower side surface of the fan housing portion 45, the upper ends of the hook plates 131, 131 of the projecting portion 94 expand left and right against the bias of the torsion springs 134, 134. Accordingly, the relative movement of the attachment 90 is permitted. When the relative movement of the attachment 90 is restricted by contact of the respective engaging portions, the claw portions 133, 133 reach the locking grooves 56, 56, simultaneously. Then the hook plates 131, 131 return to the parallel posture by the biasing of the torsion springs 134, 134. Accordingly, as illustrated in FIG. 17, together with the engagement between the respective engaging portions, the claw portions 133, 133 are locked into the locking grooves 56, 56.

On the other hand, in conjunction with the relative movement of the attachment 90, the pin 122 that abuts on the circular protrusion 83 of the shutter 74 pushes up the shutter 74 against the biasing of the coil spring 75. Accordingly, as illustrated in FIG. 18, the lower air inlet 77 opens, and the seal portion 119 of the rubber cap 118 abuts on the lower surface of the cap 73 and is elastically deformed to seal between the lower air inlet 77 and the exhaust outlet 117.

Thus, a dust collection system S in which the attachment 90 is mounted in a state of being restricted from moving upper and lower, and front, rear, right, and left with respect to the hammer drill 1 is obtained. In the state, the attachment side dust collection flow passage R4 communicates with the power-tool-side dust collection flow passage R2.

Figure 17:
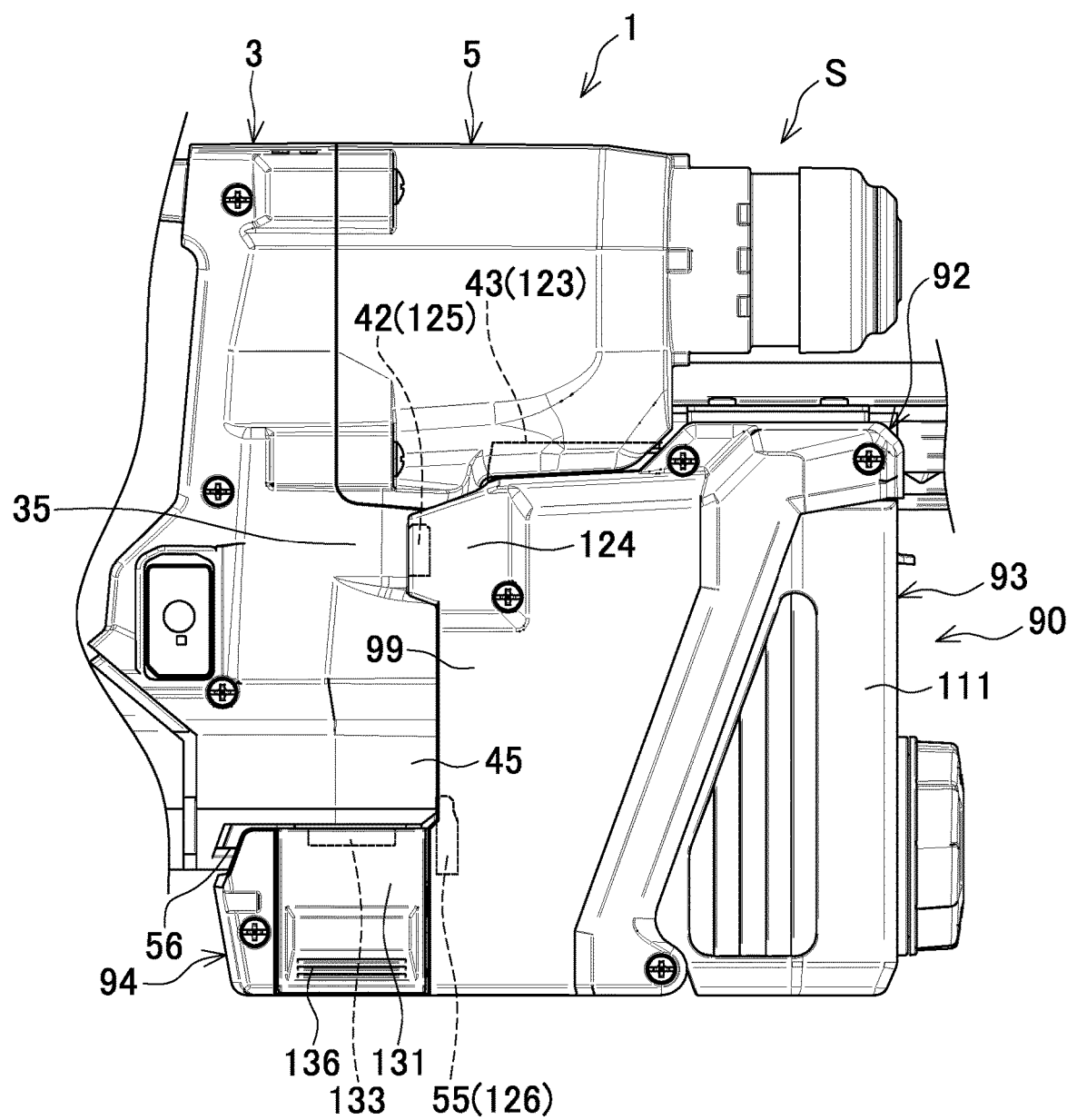
FIG. 17 is a side view of a mounting portion of the dust collection attachment in a dust collection system.
Figure 18:
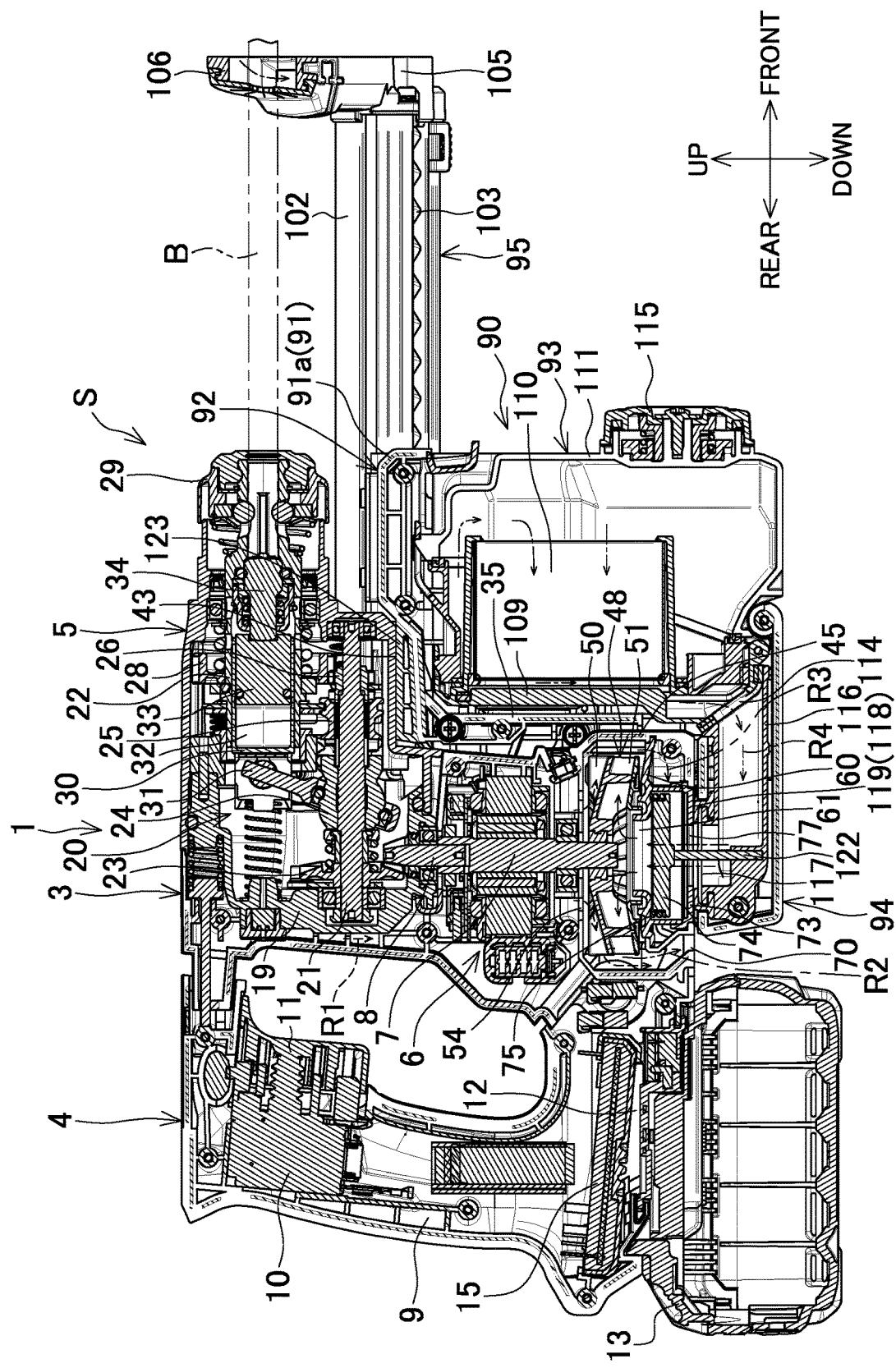
FIG. 18 is a center vertical cross-sectional view of the dust collection system.

When forming the dust collection system S, it is only necessary to relatively move the attachment 90 in the set position in FIG. 16 to the mounting position in FIGS. 17 and 18. Accordingly, a stroke of the relative movement of the attachment 90 at mounting can be shortened. FIG. 16 indicates the set position in which the rib 127 of the front back plate 100 of the casing 91 abuts on the front surface of the motor housing portion 35 and the fan housing portion 45 from the front. The set position is a positioning state in which the upper engaging portion 42 and the upper projection 125, the lower engaging portion 55 and the lower projection 126, and the engaging groove 43 and the engaging rail 123 are aligned on the same lines in the up-down direction. Accordingly, position adjustment of the respective engaging portions can be easily performed, and subsequent mounting of the attachment 90 can be smoothly performed.

In the dust collection system S, the suction opening 106 of the attachment 90 is pressed to a surface of a workpiece to be processed and a distal end of a bit B (FIG. 18) is set inside the suction opening 106. In the state, a push-in operation is performed on the trigger 11 of the hammer drill 1. Then, the switch 10 turns ON and the controller 15 drives the motor 6. Accordingly, the rotation shaft 7, and the intermediate shaft 21 via the pinion 8 rotate. Subsequently, operating the switching knob 18 disposed on the side surface of the front housing 5 leads to sliding of the clutch 25. Then, any of an advance position (a drill mode), a retreat position (a hammer mode), and an intermediate position (a hammer drill mode) is selectable. At the advance position, the clutch 25 engages only with the second gear 26. At the retreat position, the clutch 25 engages only with the boss sleeve 24. At the intermediate position, the clutch 25 simultaneously engages with both the second gear 26 and the boss sleeve 24. In the drill mode, the tool holder 22 rotates via the third gear 28 to rotate the bit B. In the hammer mode, the piston cylinder 30 reciprocates by a swing of the arm 31. Accordingly, the striker 33 reciprocates in conjunction with the piston cylinder 30 via the air chamber 32. Then, the striker 33 impacts the bit B via the impact bolt 34. In the hammer drill mode, the rotation of the tool holder 22 and the impacting of the impact bolt 34 are simultaneously performed.

When the hammer drill 1 is advanced with the suction opening 106 set, the slide tube 102 retreats together with the nozzle 105, and the bit B passes through the suction opening 106, allowing processing of the workpiece.

The double fan 48 rotates simultaneously with the rotation of the rotation shaft 7. Accordingly, rotation of the motor cooling fan 50 results in an air flow inside the motor cooling flow passage R1. Specifically, the air suctioned from the upper air inlet 3c passes in order of the main body housing 3, the front housing 5, and the motor 6, and cools them. Then, the air after cooling enters the upper space A1 of the fan housing portion 45 from the upper ventilation port 54 and is discharged from the bottom surface exhaust outlet 70.

On the other hand, by rotation of the dust collection fan 51, the air flows inside the attachment side dust collection flow passage R4 and the power-tool-side dust collection flow passage R2. Specifically, the air suctioned from the suction opening 106 where a suctioning force is generated flows in order of the flexible hose 103, the duct 107, the dust box 93, and the exhaust cylinder 116. Subsequently, the air passes the lower ventilation port 61 of the baffle plate 60 from the lower air inlet 77, enters the upper space A1, and is discharged from the bottom surface exhaust outlet 70. Simultaneously, a part of the air that has entered the upper space A1 flows into the branch flow passage R3. Specifically, a part of the air enters the lower space A2 via the communication port 85 and is discharged from the side exhaust outlets 58, 58.

Consequently, the dust generated from the workpiece is suctioned by the suction opening 106 and enters inside the dust box 93 through the nozzle 105, the flexible hose 103, and the duct 107. Subsequently, the dust is captured by the filter 110 to accumulate inside the box main body 111.

In removing the attachment 90, the fingerholds 136, 136 of the left and right hook plates 131, 131 of the projecting portion 94 are sandwiched to be pushed into the inside. Then, the hook plates 131, 131 become an expanding posture where the upper ends expand outward to the left and right from the parallel posture, and the respective claw portions 133, 133 are separated from the respective locking grooves 56, 56. Accordingly, as illustrated in FIG. 16, when the attachment 90 is slid downward or the hammer drill 1 is slid upward, directly, the upper projection 125 and the lower projection 126 are released from the upper engaging portion 42 and the lower engaging portion 55 downward, respectively. Simultaneously, the engaging rail 123 becomes in a set position where the engaging rail 123 is released downward from the engaging groove 43. Thus, moving the attachment 90 forward relatively from the hammer drill 1 allows separation from the hammer drill 1. Since it is only necessary to move the attachment 90 relatively from the mounting position in FIGS. 17 and 18 to the set position in FIG. 16, the stroke of the relative movement of the attachment 90 at removal can be shorten.

The dust accumulated in the box main body 111 of the dust box 93 can be disposed by removing the dust box 93 from the attachment 90 and opening the lid body 109.

Effects of the disclosure according to the hammer drill are provided below.

The hammer drill 1 of the above-described embodiment includes the housing 2 and the impact mechanism unit 20. The housing 2 is configured to mount the attachment 90. The impact mechanism unit 20 is disposed inside the housing 2 and can impact by the striker 33 (an impact element) that reciprocates the bit B (the tool bit) attached to the front end. The hammer drill 1 includes the motor 6 and the dust collection fan 51. The motor 6 is disposed inside the housing 2 such that the rotation shaft 7 intersects with an impact axis direction of the impact mechanism unit 20. The dust collection fan 51 is disposed on the rotation shaft 7. Then, the dust collection fan 51 is disposed on the lower side of the motor 6.

According to the configuration, it is unnecessary to enlarge the motor housing portion 35 (the motor housing) in the radial direction corresponding to the outer diameter of the dust collection fan 51. Accordingly, even when the dust collection fan 51 is disposed, the downsizing of the hammer drill 1 can be maintained.

In particular, the rotation shaft 7 is provided with the motor cooling fan 50 that is adjacent to the dust collection fan 51 in the axial direction of the rotation shaft 7. Accordingly, even when the motor cooling fan 50 is disposed in addition to the dust collection fan 51, it is unnecessary to enlarge the motor housing portion 35 (a housing portion of the motor) in the radial direction, and the downsizing can be maintained.

The lower air inlet 77 (the air inlet) that suctions air by the rotation of the dust collection fan 51 is disposed on the lower surface of the housing 2. Accordingly, foreign matter such as dust is less likely to enter from the lower air inlet 77, and a wide opening area for the lower air inlet 77 can be secured.

The bottom surface exhaust outlet 70 (the exhaust outlet) that discharges air by the rotation of the dust collection fan 51 is disposed on the lower surface of the housing 2. Accordingly, foreign matter such as dust is less likely to enter from the bottom surface exhaust outlet 70, and a wide opening area for the bottom surface exhaust outlet 70 can be secured.

The side exhaust outlet 58 (the second exhaust outlet) that discharges air by the rotation of the dust collection fan 51 is disposed on the side surface of the housing 2. Accordingly, a necessary airflow volume can be secured.

The lower air inlet 77 is openable and closable by the disc-shaped shutter 74. Accordingly, even when the lower air inlet 77 is disposed, the dust-proof performance and the waterproof performance of the hammer drill 1 can be secured.

The shutter 74 is disposed coaxially with the dust collection fan 51. Accordingly, the shutter 74 can be disposed compactly. The airflow becomes smooth when the shutter 74 is opened.

The fan housing portion 45 (a housing portion of the dust collection fan) in the housing 2 has a right-left width larger than that of the motor housing portion 35 in the housing 2. Accordingly, the motor housing portion 35 becomes slim and has a better appearance.

The bearing 39 that supports the rotation shaft 7 inside the housing 2 is disposed on the upper side with respect to the dust collection fan 51. Accordingly, the downsizing of the motor housing portion 35 including the bearing 39 portion can be maintained.

The upper engaging portion 42 and the lower engaging portion 55 are disposed in the housing 2. The upper projection 125 and the lower projection 126 are disposed in the attachment 90. By relatively sliding the attachment 90 in the up-down direction (predetermined straight-line direction) relative to the housing 2, the upper engaging portion 42 and the lower engaging portion 55 engage with the upper projection 125 and the lower projection 126, with one another, enabling the mounting of the attachment 90. The upper engaging portion 42 and the lower engaging portion 55 disposed in the housing 2 are disposed by being separated in the up-down direction.

Accordingly, the attachment 90 can be mounted without rattling even when the upper engaging portion 42 and the lower engaging portion 55 are not formed to be long. Thus, it becomes unnecessary to change the shape of the housing 2, and the downsizing and the weight reduction can be maintained.

Modifications of the disclosure according to the hammer drill are provided below.

The shape and the size of the dust collection fan is not limited to the above-described embodiment. For example, a dust collection fan without a cover on a lower surface can be employed. A fan other than the centrifugal fan can also be employed.

In the above-described embodiment, while the double fan having the motor cooling fan adjacent to the dust collection fan is employed, instead of the double fan, only a dust collection fan may be disposed on a lower side of a motor.

It is only necessary that a motor is disposed such that a rotation shaft is disposed so as to intersect with the impact axis direction, and it is not limited to an orthogonal arrangement as in the above-described embodiment.

The position and the size of the air inlet is not limited to those of the lower air inlet of the above-described embodiment. The shape of the shutter is changeable, as necessary. A shutter does not need to have a structure where the shutter moves up and down to open and close an air inlet as the above-described embodiment. For example, a structure where a part of a shutter is coupled to a fan housing portion by, for example, a hinge, and the shutter rotates around the axis to open and close an air inlet may be employed. A structure where a shutter linearly moves in a direction intersecting with an air inlet to open and close the air inlet may be employed.

An air inlet and an exhaust outlet can be disposed in a place other than a lower surface of a housing. Accordingly, regarding a cap and a shutter, it is only necessary to change a position and a shape corresponding to a position of an air inlet.

In a fan housing portion, a communication port between an upper space and a lower space can be eliminated. Specifically, a side exhaust outlet can be omitted by eliminating a branch flow passage.

A configuration of a power-tool-side dust collection flow passage inside a fan housing portion can also be changed, as necessary. Air may be sent to a battery mounting portion side to use for cooling a controller.

In the disclosure, the structure of the engaging portions with the attachment disposed in the impact tool is not limited to one that separates them in an up-down direction like the upper engaging portion and the lower engaging portion of the above-described embodiment. Specifically, a structure where an attachment is mounted by causing one or a pair of projecting side engaging portions and one or a pair of depressed side engaging portions, which extend in the up-down direction, to engage with one another may be employed.

In the above-described embodiment, the attachment is set to be removably mountable by relative movement with respect to the hammer drill in the up-down direction. However, the attachment may be set to be removably mountable by relative movement in the front-rear direction or the right-left direction.

A mounting structure of the attachment to the housing in the disclosure is not limited to an engagement between engaging portions by a linear movement like the above-described embodiment. For example, it is possible to change the mounting structure to an engage/disengage structure between a lock portion such as a hook and a locked portion such as a depressed portion, as necessary.

A configuration of an impact mechanism unit is not limited to the above-described embodiment. A motor other than a brushless motor can be employed.

The disclosure is not limited to a hammer drill and other impact tool such as an electric hammer can be employed. Instead of a DC tool, an AC tool can be employed.

Effects of the disclose according to the dust collection system are provided below.

In the above-described dust collection system S, the projecting side engaging portions and the depressed side engaging portions are each separated in the up-down direction. The projecting side engaging portions include the upper projection 125 (first projecting side engaging portion) and the lower projection 126 (second projecting side engaging portion). The upper projection 125 and the lower projection 126 are disposed in the attachment 90. The depressed side engaging portions includes the upper engaging portion 42 (first depressed side engaging portion) and the lower engaging portion 55 (second depressed side engaging portion). The upper engaging portion 42 and the lower engaging portion 55 are disposed in the housing 2. The upper engaging portion 42 engages with the upper projection 125 in a mounted state of the attachment 90. The lower engaging portion 55 engages with the lower projection 126 in the mounted state. By relatively sliding the attachment 90 in the up-down direction (predetermined straight-line direction) relative to the housing 2 of the hammer drill 1, the upper engaging portion 42 engages with the upper projection 125, and the lower engaging portion 55 engages with the lower projection 126. Thus, the attachment 90 can be mounted.

According to the configuration, the attachment 90 can be mounted without rattling even when the upper engaging portion 42 and the lower engaging portion 55 are not formed to be long. Thus, it becomes unnecessary to change the shape of the housing 2, and the downsizing and the weight reduction can be maintained.

In particular, the upper engaging portion 42 and the upper projection 125, and the lower engaging portion 55 and the lower projection 126 each are disposed in pairs on the left and right sides. Accordingly, it is possible to mount the attachment 90 in a well-balanced manner and to effectively reduce rattling in the right-left direction of the attachment 90 in the mounted state.

The pair of the upper engaging portion 42 and upper projection 125 and the pair of the lower engaging portion 55 and lower projection 126 have the right-left widths different with one another. Accordingly, the left and right arrangements of the engaging portions corresponding to the shape of the housing 2 can be employed.

The straight-line direction is the up-down direction. The pair of upper engaging portion 42 and upper projection 125 engaging with one another on the upper side has the right-left width smaller than that of the pair of lower engaging portion 55 and lower projection 126 engaging with one another on the lower side. Accordingly, the left and right arrangement of the engaging portions corresponding to the shape of the housing 2 that differs between the upper side and the lower side like between the motor housing portion 35 and the fan housing portion 45 can be employed. The larger right-left width of the lower engaging portions stabilizes a coupled state between the fan housing portion 45 and the projecting portion 94.

The upper engaging portion 42 and the upper projection 125 have the position in the front-back direction different from that of the lower engaging portion 55 and the lower projection 126. Accordingly, the front-rear arrangement of the engaging portions corresponding to the shape of the housing 2 can be employed.

When the attachment 90 is relatively slid in the up-down direction to mount to the housing 2, the lower engaging portion 55 and the lower projection 126 are engaged before the upper engaging portion 42 and the upper projection 125 are engaged. Accordingly, the preceding engagement between the lower engaging portion 55 and the lower projection 126 smoothly guides the upper projection 125 to the engaging position with the upper engaging portion 42.

The attachment 90 abuts on the housing 2 at a predetermined position before the attachment 90 is relatively slid in the up-down direction. At the predetermined position, the upper engaging portion 42 and the upper projection 125, and the lower engaging portion 55 and the lower projection 126 are positioned on the same line in the up-down direction, respectively. Accordingly, it is possible to easily perform position adjustment of the engaging portions and smoothly perform subsequent mounting of the attachment 90.

The engaging groove 43 (the third depressed side engaging portion) extending in the impact axis direction of the impact mechanism unit 20 is disposed in the housing 2. The engaging rail 123 (the third projecting side engaging portion) that engages with the engaging groove 43 in the mounted state of the attachment 90 to the housing 2 is disposed in the attachment 90. Accordingly, the rattling in the right-left direction of the attachment 90 is more effectively reduced, and integrity between the housing 2 and the attachment 90 is enhanced.

The attachment 90 has the projecting portion 94 located on the lower side of the housing 2 in the mounted state to the housing 2, and the projecting portion 94 includes the hook plates 131 (hook portions) that are locked to the housing 2 in the mounted state. Accordingly, drop off of the attachment 90 from the housing 2 is restricted, and thus, the attachment 90 does not accidentally shift or come off.

The dust collection fan 51 is disposed below the motor 6, and the lower air inlet 77 that suctions air by the rotation of the dust collection fan 51 is disposed on the lower surface of the housing 2. Accordingly, even when the dust collection fan 51 is disposed, it becomes unnecessary to enlarge the motor housing portion 35 in the radial direction, and the downsizing can be maintained. The foreign matter such as dust is less likely to enter from the lower air inlet 77, and the wide opening area for the lower air inlet 77 can be secured.

On the lower surface of the housing 2, the shutter 74 is disposed to close the lower air inlet 77 in the state where the attachment 90 is not mounted. In the projecting portion 94, the pin 122 (the pin member) is disposed to move the shutter 74 to an opening position of the lower air inlet 77 in the mounted state of the attachment 90 to the housing 2. Accordingly, even when the lower air inlet 77 is disposed, the dust-proof performance and the waterproof performance of the hammer drill 1 can be secured. Simultaneously with the mounting of the attachment 90, the shutter 74 can be surely opened by the pin 122

In the attachment 90, the sliding portion 95 including the suction opening 106 at the front end is disposed at a position offset to the left side from the center in the right-left direction. Accordingly, even when the sliding portion 95 is disposed, the attachment 90 can be mounted to the front of the housing 2.

Modifications of the disclosure according to the dust collection system are provided below.

In the above-described embodiment, the depressed side engaging portion having a groove shape is formed on the housing side of the hammer drill, and the projecting side engaging portion of the projection is formed on the attachment side. However, the formation sides of the depressed side engaging portion and the projecting side engaging portion may be reversed. Specifically, the projecting side engaging portion of the projection may be disposed on the housing side, and the depressed side engaging portion having a groove shape may be disposed on the attachment side. The projecting side engaging portion and the depressed side engaging portion may be disposed in a mixed manner in the housing and the attachment.

In the above-described embodiment, while the engaging portions on the lower side engage before the engaging portions on the upper side engage, it may be reversed. The separated engaging portions may be engaged at the same timing.

The structure of the projecting side engaging portion and the depressed side engaging portion is not limited to one where they are disposed in pairs. For example, when the projecting side engaging portion and the depressed side engaging portion are engaged in a dovetail groove shape, even when there are one projecting side engaging portion and one depressed side engaging portion, it is possible to mount and remove them.

Similar change to the engaging groove and the engaging rail is also possible. That is, the engaging rail may be disposed on the housing side, and the engaging groove may be disposed on the attachment side. However, the engaging groove and the engaging rai can be omitted.

In the above-described embodiment, while the projecting side engaging portion and the depressed side engaging portion are separated into two places in the up-down direction, they may be formed to be separated into three or more places. The right-left width and the front-rear positional relationship of the projecting side engaging portion and the depressed side engaging portion can be changed, as necessary. Accordingly, the right-left width and the front-rear positional relationship of the projecting side engaging portion and the depressed side engaging portion may be the same.

In the above-described embodiment, the attachment is set to be removably mountable by relatively moving the attachment in the up-down direction with respect to the hammer drill. However, even when the attachment is set to be removably mountable by relatively moving the attachment in the front-rear direction or right-left direction, the disclosure can be employed. Thus, it is only necessary to change a direction of the projecting side engaging portion and the depressed side engaging portion corresponding to the straight-line direction where the attachment is mounted or removed.

In the attachment, the sliding portion may be located in a right-left reversed position. The sliding portion may be disposed in the center in the right-left direction as long as it does not interfere with the mounting of the attachment. It is also possible to change the structure of the dust box, as necessary. Without disposing the projecting portion, the dust collection flow passages may be communicated between the front surface of the housing of the impact tool and the back surface of the casing of the attachment.

In the above-described embodiment, a structure where the dust collection fan is disposed in the hammer drill and the air flows inside the attachment side dust collection flow passage in the mounted state of the attachment is employed. However, the disclosure is not limited to the structure. For example, a structure where the motor and the dust collection fan are disposed inside the casing of the attachment and rotate by obtaining power supply from the impact tool in a mounted state to the impact tool is conceivable. Even in such structure, the mounting structure of the engaging portions of the disclosure can be employed.

The configuration of the impact mechanism unit is not limited to the above-described embodiment. A motor other than the brushless motor can be employed. A direction of a motor can also be changed, and a dust collection fan may be disposed on an upper side of the motor.

In the dust collection system of the disclosure, it is not limited to the hammer drill, and other impact tools such as an electric hammer can also be employed. Instead of the DC tool, an AC tool can also be employed.

Then, in the dust collection system of the disclosure, the following configurations can also be extracted.

(1) A dust collection system that includes an impact tool and a dust collection attachment. The impact tool includes a housing and an impact mechanism unit. The housing houses a motor. The impact mechanism unit is disposed inside the housing and is configured to impact by an impact element that reciprocates a tool bit mounted at a front end. The dust collection attachment is mounted to the housing.

By relatively sliding the dust collection attachment in a predetermined straight-line direction to the housing, a projecting side engaging portion disposed at any one of the housing and the dust collection attachment engages with a depressed side engaging portion disposed in the other. Thus, the dust collection attachment is allowed to be mounted The projecting side engaging portion and the depressed side engaging portion are each separated into a plurality in the straight-line direction. The dust collection system includes at least a first projecting side engaging portion and a first depressed side engaging portion that engage with one another in a mounted state of the dust collection attachment and a second projecting side engaging portion and a second depressed side engaging portion that engage with one another in the mounted state.

(2) The dust collection system described in (1), wherein the first projecting side engaging portion and the first depressed side engaging portion, and the second projecting side engaging portion and the second depressed side engaging portion are disposed in pairs on each of left and right sides.

(3) The dust collection system described in (2), wherein a pair of the first projecting side engaging portion and the first depressed side engaging portion are different in right-left width from a pair of the second projecting side engaging portion and the second depressed side engaging portion with one another.

(4) The dust collection system described in (3), wherein the straight-line direction is an up-down direction. A pair of the first projecting side engaging portion and the first depressed side engaging portion engaging with one another on an upper side is smaller in right-left width than a pair of the second projecting side engaging portion and the second depressed side engaging portion engaging with one another on a lower side.

(5) The dust collection system described in any of (1) to (4), wherein the first projecting side engaging portion and the first depressed side engaging portion is located at a position in a front-rear direction different from a position of the second projecting side engaging portion and the second depressed side engaging portion with one another.

(6) The dust collection system described in any of (1) to (5), wherein the dust collection attachment is relatively slid in the straight-line direction with respect to the housing when mounting. Wherein, the engagement of the first projecting side engaging portion and the first depressed side engaging portion is prior to the engagement of the second projecting side engaging portion and the second depressed side engaging portion or the engagement of the second projecting side engaging portion and the second depressed side engaging portion is prior to the engagement of the first projecting side engaging portion and the first depressed side engaging portion.

(7) The dust collection system described in any of (1) to (6), wherein the dust collection attachment abuts on the housing at a predetermined position before the dust collection attachment is relatively slid in the straight-line direction. At the position, the first projecting side engaging portion and the first depressed side engaging portion and the second projecting side engaging portion and the second depressed side engaging portion each are positioned on the same line in the straight-line direction.

(8) The dust collection system described in any of (1) to (7), wherein a third projecting side engaging portion extending in an impact axis direction of the impact mechanism unit is disposed in any one of the housing and the dust collection attachment. A third depressed side engaging portion that engages with the third projecting side engaging portion in a mounted state of the dust collection attachment to the housing is disposed in the other.

(9) The dust collection system described in any of (1) to (8), wherein the dust collection attachment includes a projecting portion that is positioned on a lower side of the housing in the mounted state to the housing. The projecting portion is provided with a hook portion locked to the housing in the mounted state.

(10) The dust collection system described in (9), wherein a dust collection fan is disposed below the motor, and an air inlet that suctions air by rotation of the dust collection fan is disposed on a lower surface of the housing.

(11) The dust collection system described in (10), wherein a shutter that closes the air inlet in a state where the dust collection attachment is unmounted is disposed on a lower surface of the housing. The projecting portion is provided with a pressing member that moves the shutter to an opening position of the air inlet in the mounted state to housing.

(12) The dust collection system described in any of (1) to (11), wherein the dust collection attachment is provided with a sliding portion having a front end with a suction opening at a position offset on any of left and right sides from a center in a right-left direction.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An impact tool comprising:
a housing configured to mount a dust collection attachment;
an impact mechanism unit (i) inside the housing, (ii) having (a) a front end configured to receive and retain a tool bit and (b) an impact element that reciprocates, and (iii) being configured to impact the tool bit by the impact element when the tool bit is retained by the front end;
a motor having a rotation shaft that intersects an impact axis direction of the impact mechanism unit inside the housing;
a dust collection fan on the rotation shaft; and
a motor cooling fan (i) on the rotation shaft and (ii) adjacent to the dust collection fan in an axial direction of the rotation shaft; wherein
the motor cooling fan is integrally formed on an upper side of the dust collection fan with a partition plate having a circular shape in plan view as a boundary, only the partition plate is between the motor cooling fan and the dust collection fan in the axial direction, the dust collection fan is below the motor, and the motor cooling fan and the dust collection fan are on a same side of the motor in the axial direction.

2. The impact tool according to claim 1, wherein the dust collection fan and the motor cooling fan are centrifugal fans.

3. The impact tool according to claim 1, further comprising an air inlet (i) on a lower surface of the housing and (ii) suctioning air from outside the housing when the dust collection fan rotates.

4. The impact tool according to claim 3, further comprising an exhaust outlet (i) on the lower surface of the housing and (ii) discharging the air when the dust collection fan rotates.

5. The impact tool according to claim 4, further comprising a baffle plate that forms a labyrinth in close proximity to the dust collection fan and is configured to cause the air inlet to communicate with the exhaust outlet via the dust collection fan below the dust collection fan.

6. The impact tool according to claim 5, further comprising a disk-shaped shutter configured to open or close the air inlet.

7. The impact tool according to claim 6, wherein the shutter is coaxial with the dust collection fan.

8. The impact tool according to claim 7, further comprising a coil spring between the baffle plate and the shutter, wherein the coil spring is configured to position the baffle plate at a position close to the dust collection fan when the shutter is positioned at a position where the air inlet is closed.

9. The impact tool according to claim 4, further comprising a second exhaust outlet (i) on a side surface of the and (ii) discharging the air when the dust collection fan rotates.

10. The impact tool according to claim 9, wherein the side surface of the housing has a locking groove where the dust collection attachment is locked to the housing in a mounted state, the locking groove projects into a housing portion of the dust collection fan, and the second exhaust outlet has a slit shape in an up-down direction of a projection portion of the locking groove.

11. The impact tool according to claim 1, wherein a housing portion of the dust collection fan in the housing has a right-left width larger than a right-left width of a housing portion of the motor in the housing.

12. The impact tool according to claim 1, further comprising a bearing (i) above the dust collection fan and (ii) supporting the rotation shaft inside the housing.

13. The impact tool according to claim 12, further comprising a plate portion (i) between a housing portion of the dust collection fan and a housing portion of the motor and (ii) partitioning the housing portion of the dust collection fan in the housing, wherein the bearing is held on an upper surface of the plate portion.

14. The impact tool according to claim 1, wherein the dust collection attachment is configured to be mounted to the housing such that a projecting side engaging portion of one of the housing and the dust collection attachment engages with a depressed side engaging portion in a second of the housing and the dust collection attachment by relatively sliding the dust collection attachment in a predetermined straight-line direction with respect to the housing, and the projecting side engaging portion or the depressed side engaging portion in the housing is separated into a plurality in the straight-line direction.

15. The impact tool according to claim 14, wherein the projecting side engaging portion or the depressed side engaging portion is a pair on the left and right sides.

16. A dust collection system comprising:

the impact tool according to claim 1; and the dust collection attachment mounted to the housing with a suction opening for the tool bit, the dust collection attachment generating a suctioning force to the suction opening when the dust collection fan.

17. An impact tool comprising:

a housing having a mounting to receive and retain a dust collection attachment;

an impact mechanism unit (i) inside the housing, (ii) having (a) a front end configured to receive and retain a tool bit and (b) an impact element that reciprocates, and (iii) being configured to impact the tool bit by the impact element when the tool bit is retained by the front end;

a motor having a rotation shaft that intersects an impact axis direction of the impact mechanism unit inside the housing; and a dust collection fan on the rotation shaft, wherein the dust collection fan is below the motor, a lower surface of the housing includes an air inlet that suctions air from outside the housing when the dust collection fan rotates, the mounting is on an underside of the housing adjacent the dust collection fan, and the mounting is configured such that the dust collection attachment is attached to and detached from the housing in an up-down direction.

* * * * *

UNITED STATES PATENT AND TRADEMARK OFFICE
CERTIFICATE OF CORRECTION

PATENT NO. : 11,865,657 B2
APPLICATION NO. : 17/824432
DATED : January 9, 2024
INVENTOR(S) : Kiyonobu Yoshikane et al.

Page 1 of 1

It is certified that error appears in the above-identified patent and that said Letters Patent is hereby corrected as shown below:

In the Claims

At Column 21, Claim 9, Line 41, after "the" insert --housing--.

At Column 22, Claim 16, Line 32, after "fan" insert --rotates--.

Signed and Sealed this
Twenty-fifth Day of June, 2024

Katherine Kelly Vidal
*Director of the United States Patent and Trademark Office*